US010466792B2

(12) United States Patent
Cruz-Hernandez et al.

(10) Patent No.: US 10,466,792 B2
(45) Date of Patent: *Nov. 5, 2019

(54) SYSTEMS AND METHODS FOR FRICTION DISPLAYS AND ADDITIONAL HAPTIC EFFECTS

(71) Applicant: Immersion Corporation, San Jose, CA (US)

(72) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,004

(22) Filed: Aug. 6, 2018

(65) Prior Publication Data

US 2018/0373336 A1 Dec. 27, 2018

Related U.S. Application Data

(63) Continuation of application No. 15/601,580, filed on May 22, 2017, now Pat. No. 10,073,526, which is a (Continued)

(51) Int. Cl.
*G06F 3/00* (2006.01)
*G06F 3/01* (2006.01)
(Continued)

(52) U.S. Cl.
CPC ............. *G06F 3/016* (2013.01); *G06F 3/017* (2013.01); *G06F 3/0488* (2013.01); *G06T 15/04* (2013.01);
(Continued)

(58) Field of Classification Search
CPC .......................... G06F 3/016; G06F 2203/014
See application file for complete search history.

(56) References Cited

U.S. PATENT DOCUMENTS 3,843,269 A   10/1974   Hohberg
5,144,187 A    9/1992   Culp
(Continued)

FOREIGN PATENT DOCUMENTS

CN    1496549    5/2004
CN    1646833    7/2005
(Continued)

OTHER PUBLICATIONS

Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP 031339918, pp. 41-48, Mar. 2008.

(Continued)

*Primary Examiner* — Andrew W Bee
(74) *Attorney, Agent, or Firm* — Kilpatrick Townsend & Stockton LLP

(57) ABSTRACT

Systems, methods, and computer program products for providing composite haptic effects are disclosed. One disclosed method includes detecting a touch occurring in a touch area when an object contacts a touch surface and selecting a composite haptic effect to generate in response to the touch, the composite haptic effect including at least one surface-based haptic effect and at least one other effect. Based on the selected composite haptic effect, a first haptic signal can be sent to cause an actuator to vary a coefficient of friction of the touch surface and a second actuator can be caused to provide a second haptic output in addition to the variation in the coefficient of friction. The second haptic signal can be sent to a second actuator or the same actuator (Continued)

(s) used to vary the coefficient of friction can generate the second haptic output.

20 Claims, 9 Drawing Sheets

Related U.S. Application Data continuation of application No. 12/696,900, filed on Jan. 29, 2010, now Pat. No. 9,696,803.

(60) Provisional application No. 61/159,482, filed on Mar. 12, 2009, provisional application No. 61/262,041, filed on Nov. 17, 2009, provisional application No. 61/262,038, filed on Nov. 17, 2009.

(51) Int. Cl.
*G06T 15/04* (2011.01)
*G06F 3/0488* (2013.01)
*G08B 6/00* (2006.01)
*G06F 3/0346* (2013.01)

(52) U.S. Cl.
CPC .... *G06F 3/0346* (2013.01); *G06F 2200/1637* (2013.01); *G06F 2203/014* (2013.01); *G08B 6/00* (2013.01)

(56) References Cited

U.S. PATENT DOCUMENTS

| | | |
|---|---|---|
| 5,198,732 A | 3/1993 | Morimoto |
| 5,602,647 A | 2/1997 | Xu et al. |
| 5,691,898 A | 11/1997 | Rosenberg et al. |
| 5,709,219 A | 1/1998 | Chen et al. |
| 5,734,373 A | 3/1998 | Rosenberg et al. |
| 5,767,839 A | 6/1998 | Rosenberg |
| 5,844,392 A | 12/1998 | Peurach et al. |
| 5,939,816 A | 8/1999 | Culp |
| 5,952,806 A | 9/1999 | Muramatsu |
| 5,956,484 A | 9/1999 | Rosenberg et al. |
| 5,959,613 A | 9/1999 | Rosenberg et al. |
| 6,028,593 A | 2/2000 | Rosenberg et al. |
| 6,046,527 A | 4/2000 | Roopnarine et al. |
| 6,046,730 A | 4/2000 | Bowen et al. |
| 6,084,587 A | 7/2000 | Tarr et al. |
| 6,088,019 A | 7/2000 | Rosenberg |
| 6,131,097 A | 10/2000 | Peurach et al. |
| 6,147,674 A | 11/2000 | Rosenberg et al. |
| 6,169,540 B1 | 1/2001 | Rosenberg et al. |
| 6,219,032 B1 | 4/2001 | Rosenberg |
| 6,252,579 B1 | 6/2001 | Rosenberg |
| 6,285,351 B1 | 9/2001 | Chang et al. |
| 6,292,170 B1 | 9/2001 | Chang et al. |
| 6,433,711 B1 | 3/2002 | Chen |
| 6,424,333 B1 | 7/2002 | Tremblay et al. |
| 6,429,846 B2 | 8/2002 | Rosenberg et al. |
| 6,693,622 B1 | 2/2004 | Shahoian et al. |
| 6,697,086 B2 | 2/2004 | Rosenberg et al. |
| 6,703,924 B2 | 3/2004 | Tecu et al. |
| 6,850,222 B1 | 2/2005 | Rosenberg |
| 6,859,819 B1 | 2/2005 | Rosenberg et al. |
| 7,027,032 B2 | 4/2006 | Rosenberg et al. |
| 7,109,967 B2 | 9/2006 | Hioki et al. |
| 7,148,875 B2 | 12/2006 | Rosenberg et al. |
| 7,161,580 B2 | 1/2007 | Bailey et al. |
| 7,516,406 B1 | 4/2009 | Cameron |
| 7,667,687 B2 | 2/2010 | Cruz-Hernandez et al. |
| 7,812,828 B2 | 10/2010 | Westerman et al. |
| 7,815,436 B2 | 10/2010 | Cunningham et al. |
| 7,843,438 B2 | 11/2010 | Onoda |
| 7,890,863 B2 | 2/2011 | Grant et al. |
| 7,920,124 B2 | 4/2011 | Tokita et al. |
| 8,004,498 B1 | 8/2011 | Meridian |
| 8,098,235 B2 | 1/2012 | Heubel et al. |
| 8,122,354 B1 | 2/2012 | Torgerson |
| 8,157,650 B2 | 4/2012 | Grant et al. |
| 8,210,942 B2 | 7/2012 | Shimabukuro et al. |
| 8,232,969 B2 | 7/2012 | Grant et al. |
| 8,264,465 B2 | 9/2012 | Grant et al. |
| 8,294,557 B1 | 10/2012 | El Saddik et al. |
| 8,494,860 B2 | 7/2013 | Asakawa et al. |
| 8,677,274 B2 | 3/2014 | Runov et al. |
| 9,448,713 B2 | 9/2016 | Cruz-Hernandez et al. |
| 2001/0035854 A1 | 11/2001 | Rosenberg et al. |
| 2002/0033795 A1 | 3/2002 | Shahoian et al. |
| 2002/0177471 A1 | 11/2002 | Kaaresoja et al. |
| 2003/0063128 A1 | 4/2003 | Salminaa et al. |
| 2003/0117490 A1 | 6/2003 | Tecu et al. |
| 2003/0184518 A1 | 10/2003 | Numata et al. |
| 2003/0234768 A1 | 12/2003 | Rekimoto et al. |
| 2004/0017567 A1 | 1/2004 | Loicht et al. |
| 2004/0107407 A1 | 6/2004 | Henson et al. |
| 2004/0169674 A1 | 9/2004 | Linjama |
| 2004/0218910 A1 | 11/2004 | Chang et al. |
| 2004/0233162 A1 | 11/2004 | Kobayashi |
| 2004/0251780 A1 | 12/2004 | Goodson et al. |
| 2005/0017947 A1 | 1/2005 | Shahoian et al. |
| 2005/0030292 A1 | 2/2005 | Diederiks |
| 2005/0052430 A1 | 3/2005 | Shahoian et al. |
| 2005/0057526 A1 | 3/2005 | Kinoshita et al. |
| 2005/0057528 A1 | 3/2005 | Kleen |
| 2006/0024647 A1 | 2/2006 | Chesnais et al. |
| 2006/0029037 A1 | 2/2006 | Chen et al. |
| 2006/0046031 A1 | 3/2006 | Janevski |
| 2006/0061545 A1 | 3/2006 | Hughes et al. |
| 2006/0061558 A1 | 3/2006 | Grant et al. |
| 2006/0101347 A1 | 5/2006 | Runov et al. |
| 2006/0106767 A1 | 5/2006 | Adcock et al. |
| 2006/0119573 A1 | 6/2006 | Grant et al. |
| 2006/0119586 A1 | 6/2006 | Grant et al. |
| 2006/0181510 A1 | 8/2006 | Faith |
| 2006/0209037 A1 | 9/2006 | Wang et al. |
| 2006/0226298 A1 | 10/2006 | Pierson |
| 2006/0267416 A1 | 11/2006 | Suzuki |
| 2006/0278065 A1 | 12/2006 | Ramstein |
| 2006/0290662 A1 | 12/2006 | Houston et al. |
| 2007/0021961 A1 | 1/2007 | Oh |
| 2007/0066283 A1 | 3/2007 | Haar et al. |
| 2007/0152974 A1 | 7/2007 | Kim et al. |
| 2007/0236450 A1 | 10/2007 | Colgate et al. |
| 2007/0236474 A1 | 10/2007 | Ramstein |
| 2007/0279401 A1 | 12/2007 | Ramstein et al. |
| 2007/0290988 A1 | 12/2007 | Nogami et al. |
| 2008/0048974 A1 | 2/2008 | Braun et al. |
| 2008/0068348 A1 | 3/2008 | Rosenberg et al. |
| 2008/0068648 A1 | 3/2008 | Benz et al. |
| 2008/0122589 A1 | 5/2008 | Ivanov |
| 2008/0216578 A1 | 9/2008 | Takashima et al. |
| 2008/0218488 A1 | 9/2008 | Yang et al. |
| 2008/0226134 A1 | 9/2008 | Stetten et al. |
| 2009/0046054 A1 | 2/2009 | Olien |
| 2009/0063472 A1 | 3/2009 | Pell et al. |
| 2009/0079296 A1 | 3/2009 | Takahashi |
| 2009/0102805 A1 | 4/2009 | Meijer et al. |
| 2009/0106655 A1 | 4/2009 | Grant et al. |
| 2009/0112572 A1 | 4/2009 | Thorn et al. |
| 2009/0134744 A1 | 5/2009 | Yoon et al. |
| 2009/0167701 A1 | 7/2009 | Ronkainen |
| 2009/0178008 A1 | 7/2009 | Herz et al. |
| 2009/0207129 A1 | 8/2009 | Ullrich et al. |
| 2009/0227296 A1 | 9/2009 | Kim |
| 2009/0284485 A1 | 11/2009 | Colgate et al. |
| 2010/0020036 A1 | 1/2010 | Hui et al. |
| 2010/0026976 A1 | 2/2010 | Meehan et al. |
| 2010/0073304 A1 | 3/2010 | Grant et al. |
| 2010/0079264 A1 | 4/2010 | Hoellwarth |
| 2010/0108408 A1 | 5/2010 | Colgate et al. |
| 2010/0128002 A1 | 5/2010 | Stacy et al. |
| 2010/0145934 A1 | 6/2010 | Tran et al. |
| 2010/0188327 A1 | 7/2010 | Frid et al. |
| 2010/0231539 A1 | 9/2010 | Cruz-Hernandez et al. |
| 2010/0315212 A1 | 12/2010 | Radivojevic |

(56) References Cited

U.S. PATENT DOCUMENTS

| | | | |
|---|---|---|---|
| 2011/0115709 A1 | 5/2011 | Cruz-Hemandez | |
| 2011/0157088 A1 | 6/2011 | Motomura et al. | |
| 2011/0248817 A1 | 10/2011 | Houston et al. | |
| 2011/0287986 A1 | 11/2011 | Mordukhovich et al. | |
| 2012/0154133 A1 | 6/2012 | Kyung et al. | |
| 2012/0182248 A1 | 7/2012 | Kobayashi et al. | |
| 2012/0232780 A1 | 9/2012 | Delson et al. | |

FOREIGN PATENT DOCUMENTS

| | | |
|---|---|---|
| CN | 101467118 | 6/2009 |
| CN | 101506758 | 8/2009 |
| CN | 101523329 | 9/2009 |
| CN | 101616213 | 12/2009 |
| EP | 0899 650 | 3/1999 |
| EP | 1 401 185 | 3/2004 |
| EP | 1 731 993 | 12/2006 |
| EP | 1748350 | 1/2007 |
| GB | 2 416 962 | 2/2006 |
| JP | 087182 | 1/1996 |
| JP | 11-212725 | 8/1999 |
| JP | 2001-255993 | 9/2001 |
| JP | 2001290572 | 10/2001 |
| JP | 2001296855 | 10/2001 |
| JP | 3085481 | 5/2002 |
| JP | 200391233 | 3/2003 |
| JP | 2003099177 | 4/2003 |
| JP | 2003-256105 | 9/2003 |
| JP | 2004046792 | 2/2004 |
| JP | 2004094389 | 3/2004 |
| JP | 2006-509289 | 6/2004 |
| JP | 2004-265281 | 9/2004 |
| JP | 2004530200 | 9/2004 |
| JP | 2004310518 | 11/2004 |
| JP | 2005071157 | 3/2005 |
| JP | 2005077674 | 3/2005 |
| JP | 2005078644 | 3/2005 |
| JP | 2005128891 | 5/2005 |
| JP | 2005-258666 | 9/2005 |
| JP | 2005284416 | 10/2005 |
| JP | 2008-515002 | 4/2006 |
| JP | 2006-163206 | 6/2006 |
| JP | 2006136865 | 6/2006 |
| JP | 2006-228151 | 8/2006 |
| JP | 2006268068 | 10/2006 |
| JP | 2007-133698 | 5/2007 |
| JP | 2008-027223 | 2/2008 |
| JP | 2008085487 | 4/2008 |
| JP | 2008-516348 | 5/2008 |
| JP | 2008520012 | 6/2008 |
| JP | 2008-209689 | 9/2008 |
| JP | 2008-225690 | 9/2008 |
| JP | 2008287402 | 11/2008 |
| JP | 2009-003867 | 1/2009 |
| JP | 2009002605 | 1/2009 |
| JP | 2009526244 | 7/2009 |
| JP | 2010532043 | 9/2010 |
| JP | 2015167023 | 9/2015 |
| JP | 2016201119 | 12/2016 |
| JP | 2017010571 | 1/2017 |
| JP | 6224187 | 10/2017 |
| KR | 1020020037771 | 5/2002 |
| KR | 1020090024006 | 3/2009 |
| KR | 20170016521 | 2/2017 |
| WO | WO 2001/054109 | 7/2001 |
| WO | WO 2002/073587 | 9/2002 |
| WO | WO 2004/044728 | 5/2004 |
| WO | WO 2004/051451 | 6/2004 |
| WO | WO 2004/075169 | 9/2004 |
| WO | WO 2005/103863 | 11/2005 |
| WO | 2006036803 | 4/2006 |
| WO | WO 2006/042309 | 4/2006 |
| WO | 2007019053 | 2/2007 |
| WO | WO 2007/059172 | 5/2007 |
| WO | WO 2007/091053 | 8/2007 |
| WO | WO 2007/120562 | 10/2007 |
| WO | WO 2007117418 | 10/2007 |
| WO | WO 2008/037275 | 4/2008 |
| WO | WO 2008/042745 | 4/2008 |
| WO | 2008085487 | 7/2008 |
| WO | WO 2008/103535 | 8/2008 |
| WO | WO 2008/132540 | 11/2008 |
| WO | WO 2008/144108 | 11/2008 |
| WO | WO 2009/002605 | 12/2008 |
| WO | WO 2009/026337 | 2/2009 |
| WO | WO 2009/042424 | 4/2009 |
| WO | WO 2009/074185 | 6/2009 |
| WO | 2009097866 | 8/2009 |
| WO | 2010026900 | 3/2010 |

OTHER PUBLICATIONS

De Witt, A., "Designing Sonification of User Data in Affective Interaction," Master of Science Thesis Stockholm, Sweden, XP 002551466, at hppt://w3.nada.kth.se/utbildning/grukth/exjobb/rapportlistor/2007/de_witt_anna_07142, as available via the Internet and printed Oct. 20, 2009.

Kaaresoja, T. et al., "Snap-Crackle-Pop: Tactile Feedback for Mobile Touch Screens," Proceedings of the Eurohaptics 2006, XP002551465, at http://lsc.univ-evry.fr/(eurohaptics/upload/cd/papers/f80, as available via the Internet and printed Oct. 20, 2009.

Maeno, T. et al., "Tactile Display of Surface Texture by use of Amplitude Modulation of Ultrasonic Vibration," IEEE Ultrasonics Symposium, 2006, pp. 62-65.

"MicroTouch Capacitive TouchSense System," 3M Touch System; Methuen, MA; Published 2008.

Minsky, Margaret Diane Rezvan, "Computational Haptics: The Sandpaper System for Synthesizing Texture for a Force-Feedback Display," Ph.D. Dissertation, Massachusetts Institute of Technology, Jun. 1995, 217 pages.

Oakley, I. et al., Contact IM: Exploring Asynchronous Touch over Distance, Palpable Machines Research Group, Media Lab Europe, XP007910188, at http://people.cs.vt.edu/[wangr06/touch%20review%origization/OAK002, as available via the Internet and printed Oct. 20, 2009.

Williamson, J. et al., "Shoogle: Excitatory Multimodal Interaction on Mobile Devices," CHI 2007 Proceedings-Shake, Rattle and Roll: New Forms of Input and Output, 2007, pp. 121-124, XP002549378.

Sekiguchi, Y. et al., "Haptic Interface using Estimation of Box Contents Metaphor," Proceedings of ICAT 2003, Tokyo, Japan, XP 002551467, at http://www.vrsj.org/ic-at/papers/2003/00947_00000, as available via the Internet and printed Oct. 20, 2009.

Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139.

Search Report and Written Opinion dated Jun. 8, 2010 for corresponding PCT Application No. PCT/US2010/026909.

Search Report and Written Opinion dated Jun. 8, 2010 for corresponding PCT Application No. PCT/US2010/026897.

Search Report and Written Opinion dated Jun. 8, 2010 for corresponding PCT Application No. PCT/US2010/026905.

Search Report and Written Opinion dated Jun. 8, 2010 for corresponding PCT Application No. PCT/US2010/026894.

Search Report and Written Opinion dated Jun. 8, 2010 for corresponding PCT Application No. PCT/US2010/026907.

Search Report and Written Opinion dated Jun. 8, 2010 for corresponding PCT Application No. PCT/US2010/026900.

International Preliminary Report on Patentability dated Sep. 22, 2011 for corresponding International Application No. PCT/US2010/026909.

International Preliminary Report on Patentability dated Sep. 22, 2011 for corresponding International Application No. PCT/US2010/026897.

International Preliminary Report on Patentability dated Sep. 22, 2011 for corresponding International Application No. PCT/US2010/026905.

(56) References Cited

OTHER PUBLICATIONS

International Preliminary Report on Patentability dated Sep. 22, 2011 for corresponding International Application No. PCT/US2010/026894.
International Preliminary Report on Patentability dated Sep. 22, 2011 for corresponding International Application No. PCT/US2010/026907.
International Preliminary Report on Patentability dated Sep. 22, 2011 for corresponding International Application No. PCT/US2010/026900.
Corel Paint Shop Pro Photo X2 Reviewers Guide, Copyright 2007, web page at http://web.archive.org/web/20071102133023/http://www.corel.com/conte nt!vpk!psppx2/PS P PX2Reviewer_Guide.pdf, as available via the Internet and accessed Apr. 7, 2012.
Office Action dated Nov. 2, 2012 for corresponding U.S. Appl. No. 12/947,321.
Chowdhury, M.A. et al., "The Effect of Amplitude of Vibration on the Coefficient of Friction for Different Materials," Tribology International, 2008, 41:307-314.
Tang, H. et al., "A Microfabricated Electrostatic Haptic Display for Persons with Visual Impairments," IEEE Transactions on Rehabilitation Engineering, Sep. 1998, 6(3):241-314.
Office Action dated Nov. 15, 2012 for corresponding U.S. Appl. No. 12/947,532.
Office Action dated Jan. 15, 2013 for corresponding U.S. Appl. No. 12/696,908.
Office Action dated Jan. 15, 2013 for corresponding U.S. Appl. No. 12/697,037.
Levin et al., "Tactile-Feedback Solutions for an Enhanced User Experience," Information Display, Oct. 2009, pp. 18-21.
Office Action dated Mar. 12, 2013 for corresponding U.S. Appl. No. 12/947,532.
Office Action dated Mar. 18, 2013 for corresponding U.S. Appl. No. 12/947,321.
Japanese Patent Office, Notice of Reasons for Rejection, Application No. JP 2014-171836, dated Nov. 4, 2015.
Japanese Patent Office, Notice of Reasons for Rejection, Application No. JP 2011-554174, dated Jan. 28, 2014.
Korean Patent Office, Notice of Preliminary Rejection, Application No. 10-2011-7023927, dated Sep. 30, 2015.
Korean Patent Office, Notice of Preliminary Rejection, Application No. 10-2011-7023926, dated Sep. 30, 2015.
State Intellectual Property Office of the Peoples Republic of China, Notification of the Second Office Action, Application No. 201080011708 dated Jul. 10, 2014.
State Intellectual Property Office of the Peoples Republic of China, Notification of the Third Office Action, Application No. 201080011708 dated Jan. 26, 2015.
Japanese Patent Office, Office Action, Application No. JP 2015-083829 dated Feb. 16, 2016.
Japanese Patent Office, Notice of Reasons for Rejection, Application No. JP 2011-554180 dated Jan. 7, 2014.
Japanese Patent Office, Decision of Rejection, Application No. JP 2011-554180 dated Dec. 16, 2014.
State Intellectual Property Office of the Peoples Republic of China, Notification of the Second Office Action, Application No. 201080011743 dated Apr. 3, 2014.
State Intellectual Property Office of the Peoples Republic of China, Decision on Rejection, Application No. 201080011743 dated Nov. 3, 2014.
State Intellectual Property Office of the Peoples Republic of China, Notification of the First Office Action, Application No. 201080011744 dated Sep. 23, 2013.
Japanese Patent Office, Decision of Rejection, Application No. JP 2011-554175 dated Mar. 1, 2016.
Japanese Patent Office, Notice of Reasons for Rejection, Application No. JP 2015-020413 dated Mar. 1, 2016.
Japanese Patent Office, Notice of Reasons for Rejection, Application No. JP 2015-019308 dated Feb. 26, 2016.
Japanese Patent Office, Notice of Reasons for Rejection, Application No. JP 2011-554172 dated Jan. 28, 2014.
State Intellectual Property Office of the Peoples Republic of China, Notification of the Second Office Action, Application No. 201080011744 dated Jun. 24, 2014.
State Intellectual Property Office of the Peoples Republic of China, Notification of the Third Office Action, Application No. 201080011744 dated Dec. 16, 2014.
State Intellectual Property Office of the Peoples Republic of China, Notification of the Fourth Office Action, Application No. 201080011744 dated Aug. 12, 2015.
Korean Patent Office, Notice of Preliminary Rejection, Application No. 10-2011-7023987 dated Aug. 21, 2015.
United States Patent and Trademark Office, Office Action, U.S. Appl. No. 12/696,893 dated Feb. 29, 2012.
United States Patent and Trademark Office, Office Action, U.S. Appl. No. 12/696,893 dated Sep. 6, 2012.
United States Patent and Trademark Office, Office Action, U.S. Appl. No. 12/696,893 dated Jun. 6, 2013.
United States Patent and Trademark Office, Office Action, U.S. Appl. No. 12/696,893 dated Oct. 22, 2013.
United States Patent and Trademark Office, Office Action, U.S. Appl. No. 12/696,893 dated Mar. 11, 2014.
Meyer, D. et al., Fingertip Friction Modulation due to Electrostatic Attraction, IEEE World Haptics Conference Apr. 14-18, 2013, Korea, pp. 43-48.
United States Patent and Trademark Office, Office Action, U.S. Appl. No. 12/697,010 dated May 20, 2016.
United States Patent and Trademark Office, Office Action, U.S. Appl. No. 12/697,042 dated May 17, 2016.
United States Patent and Trademark Office, Office Action, U.S. Appl. No. 12/697,037 dated Jun. 6, 2016.
United States Patent and Trademark Office, Office Action, U.S. Appl. No. 12/696,908 dated May 26, 2016.
United States Patent and Trademark Office, Office Action, U.S. Appl. No. 12/696,908 dated Nov. 10, 2016.
United States Patent and Trademark Office, Office Action, U.S. Appl. No. 12/697,010 dated Sep. 16, 2016.
United States Patent and Trademark Office, Office Action, U.S. Appl. No. 12/947,532 dated Sep. 9, 2016.
United States Patent and Trademark Office, Office Action, U.S. Appl. No. 12/697,042 dated Nov. 30, 2016.
United States Patent and Trademark Office, Office Action, U.S. Appl. No. 12/697,037 dated Jan. 17, 2017.
United States Patent and Trademark Office, Office Action, U.S. Appl. No. 12/947,532 dated Feb. 2, 2017.
United States Patent and Trademark Office, Office Action, U.S. Appl. No. 12/697,010 dated Feb. 22, 2017.
U.S. Appl. No. 15/988,359, Non-Final Office Action, dated Jun. 29, 2018, 14 pages.
U.S. Appl. No. 12/696,908, Non-Final Office Action, dated Sep. 21, 2017, 20 pages.
U.S. Appl. No. 12/696,908, Final Office Action, dated Jun. 29, 2017.
U.S. Appl. No. 12/947,532, Final Office Action, dated Sep. 8, 2017, 34 pages.
U.S. Appl. No. 12/947,321, Non-Final Office Action, dated Jun. 16, 2017.
U.S. Appl. No. 12/947,321, Final Office Action, dated Oct. 3, 2017, 36 pages.
CN Application 201510760216.2, Office Action, dated Jun. 26, 2018, 6 pages.
European Patent Office, Examination Report, Application No. 10712201.2 dated Mar. 2, 2017.
EP Application No. 10787610.4, Communication Pursuant to Art. 94(3) EPC, dated Aug. 21, 2017, 7 pages.
Japanese Patent Application 2015-020413, Final Office Action dated Apr. 4, 2017, 4 pages.
JP Application 2017-149800, Office Action, dated Jun. 26, 2018, 5 pages.
Japanese Patent Office, Notice of Reasons for Rejection, Application No. JP 2015-020413 dated Aug. 30, 2016.
KR Application 10-2016-7023565, Office Action, dated May 18, 2018, 6 pages.

(56) References Cited

OTHER PUBLICATIONS

State Intellectual Property Office of the Peoples Republic of China Application No. 201510760216.2, Office Action, dated Nov. 3, 2017, 10 pages.
"2004 UBC CS Technical Report Abstracts", The ICICS/CS Reading Room, Available Online at: http://www.cs.ubc.ca/cgi-bin/tr/2004/ful, 2004, pp. 1-5.
U.S. Appl. No. 12/696,893, "Advisory Action", dated Aug. 19, 2013, 3 pages.
U.S. Appl. No. 12/696,893, "Ex-Parte Quayle Action", dated Mar. 17, 2017, 5 pages.
U.S. Appl. No. 12/696,900, "Advisory Action", dated Apr. 11, 2013, 3 pages.
U.S. Appl. No. 12/696,900, "Advisory Action", dated Oct. 28, 2016, 3 pages.
U.S. Appl. No. 12/696,900, "Final Office Action", dated Aug. 19, 2016, 11 pages.
U.S. Appl. No. 12/696,900, "Final Office Action", dated Jan. 15, 2013, 62 pages.
U.S. Appl. No. 12/696,900, "Non-Final Office Action", dated Apr. 26, 2012, 11 pages.
U.S. Appl. No. 12/696,900, "Non-Final Office Action", dated Dec. 12, 2016, 11 pages.
U.S. Appl. No. 12/696,900, "Non-Final Office Action", dated May 9, 2016, 12 pages.
U.S. Appl. No. 12/696,908, "Advisory Action", dated Apr. 10, 2013, 3 pages.
U.S. Appl. No. 12/696,908, "Advisory Action", dated Aug. 31, 2017, 3 pages.
U.S. Appl. No. 12/696,908, "Advisory Action", dated Feb. 3, 2017, 3 pages.
U.S. Appl. No. 12/696,908, "Non-Final Office Action", dated Mar. 31, 2017, 17 pages.
U.S. Appl. No. 12/696,908, "Non-Final Office Action", dated Mar. 27, 2012, 24 pages.
U.S. Appl. No. 12/697,010, "Advisory Action", dated Apr. 9, 2013, 3 pages.
U.S. Appl. No. 12/697,010, "Advisory Action", dated Dec. 7, 2016, 3 pages.
U.S. Appl. No. 12/697,010, "Final Office Action", dated Jan. 18, 2013, 15 pages.
U.S. Appl. No. 12/697,010, "Non-Final Office Action", dated Apr. 11, 2012, 22 pages.
U.S. Appl. No. 12/697,037, "Advisory Action", dated Apr. 11, 2013, 3 pages.
U.S. Appl. No. 12/697,037, "Advisory Action", dated May 10, 2017, 3 pages.
U.S. Appl. No. 12/697,037, "Non-Final Office Action", dated Apr. 12, 2012, 16 pages.
U.S. Appl. No. 12/697,042, "Advisory Action", dated Mar. 10, 2017, 3 pages.
U.S. Appl. No. 12/697,042, "Advisory Action", dated May 10, 2017, 3 pages.
U.S. Appl. No. 12/697,042, "Final Office Action", dated Feb. 5, 2013, 46 pages.
U.S. Appl. No. 12/697,042, "Non-Final Office Action", dated Apr. 2, 2012, 21 pages.
U.S. Appl. No. 12/947,532, "Advisory Action", dated Apr. 7, 2017, 3 pages.
U.S. Appl. No. 12/947,532, "Advisory Action", dated May 20, 2014, 3 pages.
U.S. Appl. No. 12/947,532, "Advisory Action", dated May 23, 2013, 3 pages.
U.S. Appl. No. 12/947,532, "Advisory Action", dated Nov. 6, 2017, 3 pages.
U.S. Appl. No. 12/947,532, "Final Office Action", dated Mar. 11, 2014, 17 pages.
U.S. Appl. No. 12/947,532, "Non Final Office Action", dated May 23, 2017, 29 pages.
U.S. Appl. No. 12/947,532, "Non-Final Office Action", dated Sep. 27, 2013, 14 pages.
U.S. Appl. No. 13/697,010, "Office Action", dated Sep. 16, 2016.
U.S. Appl. No. 15/601,580, "Non-Final Office Action", dated Feb. 27, 2018, 5 pages.
U.S. Appl. No. 15/649,208, "Non-Final Office Action", dated Dec. 21, 2017, 5 pages.
U.S. Appl. No. 15/894,966, "Non-Final Office Action", dated Mar. 28, 2018, 6 pages.
Chakrabarti et al., "Rendering Color Information Using Haptic Feedback", University of British Columbia CS Technical Report, Available online at : https//www.cs.ubc.ca/cgi-bin/tr/2004/TR-2004-10.pdf, Jul. 22, 2004, 9 pages.
CN201080011708.7, "Office Action", dated Aug. 28, 2013, 33 pages.
CN201080011708.7, "Office Action", dated Jul. 22, 2015, 4 pages.
CN201080011743, "Office Action", dated Nov. 3, 2014.
CN201080011743.3, "Office Action", dated Jun. 24,2014.
CN201080011743.9, "Office Action", dated Dec. 16, 2015, 3 pages.
CN201080011743.9, "Office Action", dated Mar. 2, 2016, 3 pages.
CN201080011743.9, "Office Action", dated Sep. 6, 2013, 8 pages.
CN201080011746.2, "Office Action", dated Dec. 11, 2014, 18 pages.
CN201080011746.2, "Office Action", dated Aug. 19, 2013, 21 pages.
CN201080011746.2, "Office Action", dated Jun. 24, 2014, 8 pages.
CN201080011747.7, "Office Action", dated Jan. 14, 2015, 10 pages.
CN201080011747.7, "Office Action", dated Sep. 27, 2013, 8 pages.
CN201080011747.7, "Office Action", dated Jun. 18, 2014, 9 pages.
CN201080011905.9, "Office Action", dated Jan. 30, 2015, 10 pages.
CN201080011905.9, "Office Action", dated Sep. 23, 2015, 11 pages.
CN201080011905.9, "Office Action", dated Apr. 11, 2016, 18 pages.
CN201080011905.9, "Office Action", dated Sep. 27, 2013, 20 pages.
CN201080011905.9, "Office Action", dated May 14, 2014, 6 pages.
CN201080011905.9, "Office Action", dated Sep. 23, 2014, 9 pages.
CN201610196586.2, "Office Action", dated Jun. 15, 2018, 26 pages.
EP10712198.0, "Office Action", dated Feb. 27, 2017, 5 pages.
EP10712199.8, "Office Action", dated Feb. 28, 2017, 4 pages.
EP10712200.4, "Office Action", dated Mar. 1, 2017, 5 pages.
EP10712202.0, "Office Action", dated May 19, 2017, 5 pages.
JP2011-554175, "Office Action", dated Aug. 18, 2015, 12 pages.
JP2011-554175, "Office Action", dated Jan. 27, 2015, 7 pages.
JP2011-554175, "Office Action", dated Jan. 7, 2014, 7 pages.
JP2011-554178, "Office Action", dated Aug. 5, 2014, 2 pages.
JP2011-554178, "Office Action", dated Jan. 28, 2014, 4 pages.
JP2011-554179, "Office Action", dated Jan. 28, 2014, 2 pages.
JP2015-019308, "Office Action", dated Mar. 1, 2016, 8 pages.
JP2015-020403, "Office Action", dated Feb. 2, 2016, 2 pages.
JP2015-020413, "Office Action", dated Apr. 1, 2016.
JP2015-083829, "Office Action", dated Nov. 8, 2016, 2 pages.
JP2015-083829, "Office Action", dated Jun. 21, 2016, 3 pages.
JP2016-123698, "Office Action", dated Feb. 7, 2017, 2 pages.
JP2016-130597, "Office Action", dated Mar. 28, 2017, 6 pages.
JP2016-151799, "Office Action", dated Apr. 25, 2017, 4 pages.
KR10-2011-7023926, "Office Action", dated May 1, 2016, 4 pages.
KR10-2011-7023926, "Office Action", dated Feb. 3, 2017, 5 pages.
KR10-2011-7023926, "Office Action", dated Jun. 20, 2016, 6 pages.
KR10-2011-7023926, "Office Action", dated Jan. 31, 2017, 7 pages.
KR10-2011-7023927, "Office Action", dated Jun. 24, 2016, 12 pages.
KR10-2011-7023927, "Office Action", dated May 12, 2016, 5 pages.
KR10-2011-7023927, "Office Action", dated Dec. 30, 2016, 6 pages.
KR10-2011-7023927, "Office Action", dated Jan. 1, 2017, 9 pages.

(56) References Cited

OTHER PUBLICATIONS

KR10-2011-7023928, "Office Action", dated Apr. 28, 2016, 5 pages.
KR10-2011-7023928, "Office Action", dated Aug. 24, 2015, 9 pages.
KR10-2011-7023930, "Office Action", dated Nov. 18, 2015, 11 pages.
KR10-2011-7023987, "Office Action", dated Apr. 27, 2016, 5 pages.
KR10-2011-7023987, "Office Action", dated Nov. 29, 2016, 5 pages.
KR10-2011-7023988, "Office Action", dated Nov. 6, 2015, 4 pages.
KR10-2016-7024778, "Office Action", dated Apr. 28, 2017, 11 pages.
KR10-2016-7024778, "Office Action", dated Oct. 21, 2016, 7 pages.
KR10-2016-7024890, "Office Action", dated Oct. 27, 2016, 6 pages.
KR10-2016-7029343, "Office Action", dated Jan. 18, 2017, 10 pages.
KR10-2017-7002821, "Office Action", dated Feb. 20, 2017, 13 pages.
KR10-2017-7002821, "Office Action", dated Aug. 29, 2017, 7 pages.
KR10-2017-7002821, "Office Action", dated Nov. 14, 2017, 7 pages.
Kumazawa et al., "Seeking User Interface Casually Used Immediately After Touched, ILE Technical Report", The Institute of Image Information and Television Engineers, vol. 29, No. 46, Aug. 29, 2005, pp. 67-70.
PCT/US10/56867, "International Preliminary Report on Patentability", dated May 31, 2012, 9 pages.
PCT/US10/56867, "International Search Report and Written Opinion", dated Feb. 28, 2011, 11 pages.
PCT/US2010/056829, "International Search Report and Written Opinion", dated Oct. 11, 2011, 11 pages.
PCT/US2010/056867, "International Preliminary Report on Patentability", dated May 31, 2012, 9 pages.
PCT/US2010/056867, "International Search Report and Written Opinion", dated Feb. 28, 2011, 11 pages.
Rovers et al., "HIM: A Framework for Haptic Instant Messaging", CHI 2004, CHI Conference Proceedings, Human Factors in Computing Systems, Apr. 24-29, 2004, pp. 1313-1316.

SYSTEMS AND METHODS FOR FRICTION DISPLAYS AND ADDITIONAL HAPTIC EFFECTS

CROSS-REFERENCE TO RELATED APPLICATIONS

This patent application is a continuation of and claims the benefit of U.S. application Ser. No. 15/601,580, entitled "Systems and Methods for Friction Displays and Additional Haptic Effects," filed on May 22, 2017, which is a continuation of and claims the benefit of U.S. application Ser. No. 12/696,900, entitled "Systems and Methods for Friction Displays and Additional Haptic Effects," filed on Jan. 29, 2010, which claims priority to U.S. Provisional Patent Application No. 61/159,482, entitled "Locating Features Using a Friction Display," filed Mar. 12, 2009 and also claims priority to U.S. Provisional Patent Application No. 61/262,041, entitled "System and Method for Increasing Haptic Bandwidth in an Electronic Device" filed Nov. 17, 2009, and also claims priority to U.S. Provisional Patent Application No. 61/262,038, entitled "Friction Rotary Device for Haptic Feedback" filed Nov. 17, 2009, the entirety of all of which is hereby incorporated herein by reference.

This Application is related to U.S. patent application Ser. No. 12/697,010, which was filed the same day as application Ser. No. 12/696,900 and is entitled "Systems and Methods for a Texture Engine," which is incorporated by reference herein in its entirety.

This Application is related to U.S. patent application Ser. No. 12/697,042, filed the same day as application Ser. No. 12/696,900 and is entitled "Systems and Methods for Using Multiple Actuators to Realize Textures," which is incorporated by reference herein in its entirety.

This patent application is related to U.S. patent application Ser. No. 12/697,037, filed the same day as application Ser. No. 12/696,900 and is entitled "Systems and Methods for Using Textures in Graphical User Interface Widgets," which is incorporated by reference herein in its entirety.

This patent application is related to U.S. patent application Ser. No. 12/696,893, filed the same day as application Ser. No. 12/696,900 and is entitled "Systems and Methods for Providing Features in a Friction Display," which is incorporated by reference herein in its entirety.

This patent application is related to U.S. patent application Ser. No. 12/696,908, filed the same day as application Ser. No. 12/696,900 and is entitled "Systems and Methods for Interfaces Featuring Surface-Based Haptic Effects," which is incorporated by reference herein in its entirety.

BACKGROUND

Touch-enabled devices have become increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device.

For example, a user may touch a portion of the display or surface that is mapped to an on-screen graphical user interface, such as a button or control. As another example, a gesture may be provided, such as a sequence of one or more touches, drags across the surface, or other recognizable patterns sensed by the device. Although touch-enabled displays and other touch-based interfaces have greatly enhanced device functionality, drawbacks remain. For instance, even if a keyboard is displayed on a screen, a user accustomed to a physical keyboard may not have the same experience while using the touch-enabled device.

SUMMARY

Embodiments include systems and methods for providing composite haptic effects comprising a variation in a coefficient of friction of a touch surface and one or more other outputs. By providing such surface-based effects, a device can provide a more compelling user experience than may otherwise have been achieved.

In one embodiment, a method comprises detecting, using at least one sensor, a touch occurring in a touch area when an object contacts a touch surface. The method can further comprise selecting a composite haptic effect to generate in response to the touch, the composite haptic effect including at least one surface-based haptic effect and at least one other effect. Based on the selected composite haptic effect, a first haptic signal can be sent to a first actuator to cause the first actuator to vary a coefficient of friction of the touch surface. The method can further comprise, based on the selected composite haptic effect, sending a second haptic signal to cause an actuator to provide a second haptic output in addition to the variation in the coefficient of friction. The second haptic signal can be sent to a second actuator or the same actuator(s) used to vary the coefficient of friction can generate the second haptic output. Another embodiment comprises a tangible computer storage medium embodying program code executable by a computing system for carrying out such a method.

These illustrative embodiments are mentioned not to limit or define the limits of the present subject matter, but to provide examples to aid understanding thereof. Additional embodiments include systems and devices configured to provide composite haptic effects and computer storage media embodying program code for providing composite haptic effects. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 3A shows another illustrative system configured to provide composite haptic effects, while

DETAILED DESCRIPTION

Figure 1A:
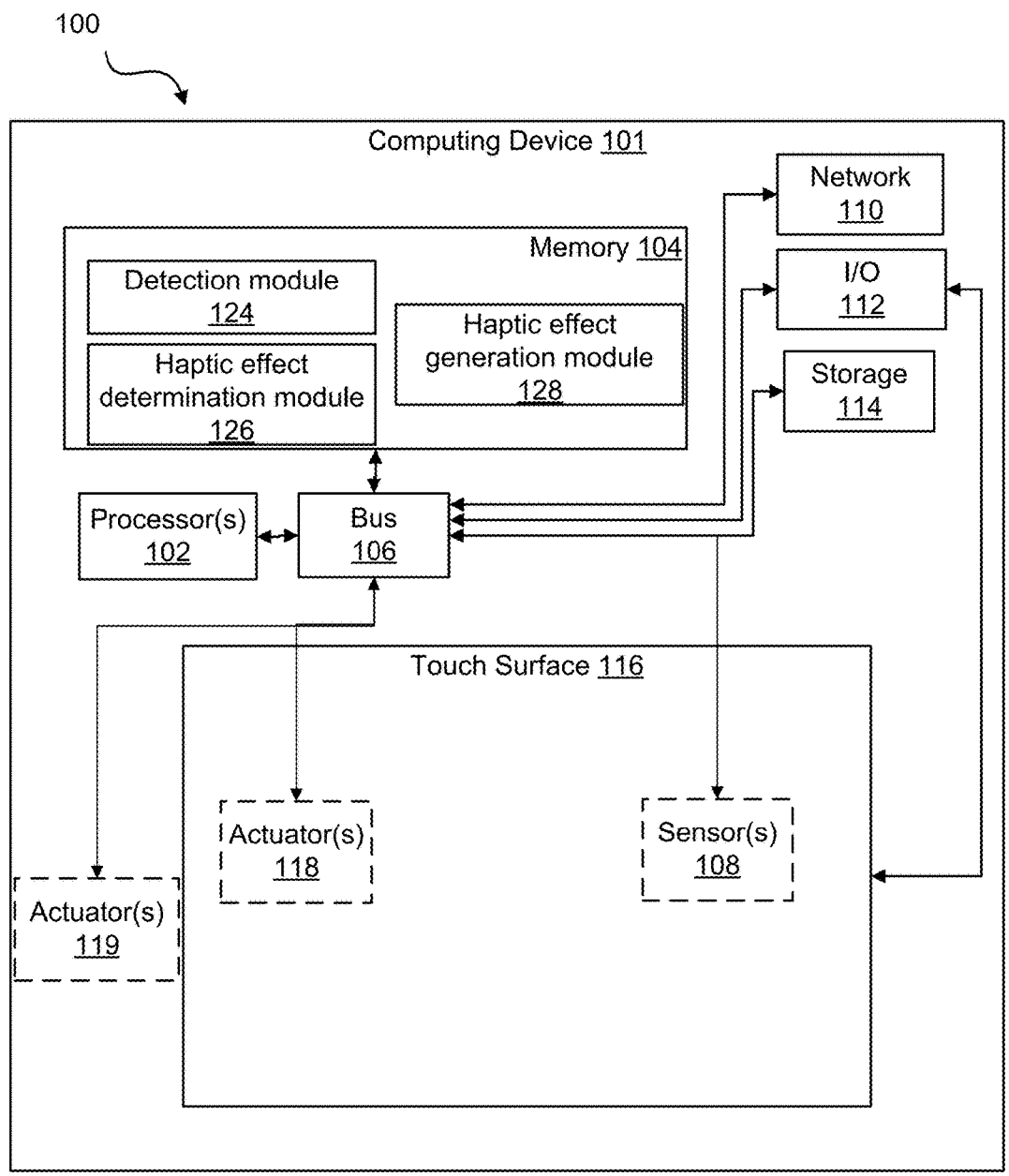
FIG. 1A is a block diagram showing an illustrative system configured to provide composite haptic effects.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device Configured to Provide Composite Haptic Effects One illustrative embodiment of the present invention comprises a computing system such as an iPod® portable music device or iPhone® mobile device, both available from Apple Inc. of Cupertino, Calif., or a Zune® portable device, available from Microsoft Corporation of Redmond, Wash. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more actuators are used to provide tactile effects, including (but not limited to) composite haptic effects. A composite haptic effect can comprise an effect that utilizes a variation in a coefficient of friction of a touch surface along with one or more other haptic outputs presented in combination with the variation in coefficient of friction. The other output(s) may be presented at the same time as the variation in the coefficient of friction, shortly before, and/or shortly after. The composite effect may be perceived as a single effect or may be perceived as a plurality of related effects.

For example, as a user moves a finger across the device, the coefficient of friction of the screen can be varied based on the position, velocity, and/or acceleration of the finger. Depending on how the friction is varied, the user may perceive a feature and/or a texture. As a particular example, the friction may be varied so that the user perceives a bump, border, or other obstacle corresponding to an edge of an on-screen button. The composite haptic effect may further include tactile feedback as the on-screen button is pressed. As another example, a vibration-based effect may be generated so that a user perceives a feature such as a bump, border, or obstacle defining a control area, with a variation in the coefficient of friction used to indicate when the control is selected/changed. Still further, a combination of variation in friction and vibrotactile effects may be used in combination to create the perception of a single texture or other feature.

The variation in the coefficient of friction and other effect(s) may be generated by the same actuator or by different actuators working in concert. For instance, the coefficient of friction can be varied using a piezoelectric actuator, while vibrotactile effects are generated using a linear resonant actuator. As another example of examples of a haptic output that can be used alongside variations in the coefficient of friction, a portion of a touch surface can be raised/lowered (e.g., using an actuator or shape memory alloy).

Illustrative Systems for Providing Surface-Based Haptic Effects in Conjunction with Other Haptic Effects FIG. 1A shows an illustrative system 100 for providing a composite haptic effect. Particularly, in this example, system 100 comprises a computing device 101 featuring a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device(s) 110 can represent any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as a one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which is in this example integrated into device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and to determine other information, such as touch pressure. As another example, optical sensors may be used.

In this example, a first actuator 118 in communication with processor 102 is coupled to touch surface 116. In some embodiments, first actuator 118 is configured to output a haptic output varying a coefficient of friction of the touch surface in response to a first haptic signal. Additionally or alternatively, first actuator 118 may provide haptic output by moving the touch surface in a controlled manner. Some haptic outputs may utilize an actuator coupled to a housing of the device, and some haptic outputs may use multiple actuators in sequence and/or in concert. For example, the coefficient of friction can be varied by vibrating the surface at different frequencies and/or amplitudes. Different combinations/sequences of variance can be used to simulate the feeling of a texture, presence of another feature such as an obstacle or protrusion, or to provide another effect.

Although a single first actuator 118 is shown here, embodiments may use multiple actuators of the same or different type to vary the coefficient of friction of the touch surface. For example, a piezoelectric actuator is used in some embodiments to displace some or all of touch surface 116 vertically and/or horizontally at ultrasonic frequencies.

FIG. 1A also shows a second actuator 119. Second actuator 119 can be used to provide a second haptic output in addition to the variation in the coefficient of friction as provided by the first actuator. For example, the second haptic output may comprise a vibrotactile haptic effect such as a vibration of the device and/or touch surface 116. As another example, the second haptic output may comprise a change in the touch surface 116, such as a change in temperature, color, or texture generated by raising/lowering portions of touch surface 116.

Actuators 118 and 119 may each comprise multiple actuators, and may be of the same or different types. Suitable actuator types include, but are not limited to, piezoelectric actuators, shape memory alloys, electroactive polymers, flexible composite piezoelectric actuators (e.g., an actuator comprising a flexible material), electromagnetic actuators, eccentric rotational mass actuators, linear resonant actuators, voice coil actuators, electrostatic actuators, and/or magnetostrictive actuators. Although shown as separate elements 118 and 119, a single actuator capable of varying the coefficient of friction of touch surface 116 and generating another haptic effect could be used instead of separate first and second actuators. Additionally, in practice one or more of the actuators could be embedded within touch surface 116.

Turning to memory 104, exemplary program components 124, 126, and 128 are depicted to illustrate how a device can be configured in some embodiments to provide composite haptic effects. In this example, a detection module 124 configures processor 102 to monitor touch surface 116 via sensor(s) 108 to determine a position of a touch. For example, module 124 may sample sensor 108 in order to track the presence or absence of a touch and, if a touch is present, to track the location, path, velocity, acceleration, pressure and/or other characteristics of the touch over time.

Haptic effect determination module 126 represents a program component that analyzes data regarding touch characteristics to select a composite haptic effect to generate. For example, in some embodiments, an input gesture comprising a sequence of one or more touches may be recognized and correlated to one or more composite haptic effects. As another example, some or all of the area of touch surface 116 may be mapped to a graphical user interface. Different composite haptic effects may be selected based on the location of a touch in order to simulate the presence of a feature displayed on a screen by varying the friction of touch surface and providing one or more other haptic outputs so that the feature is "felt" when a portion of touch surface 116 mapped to a screen location containing the feature is encountered. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator(s) 118/119 to generate the selected composite haptic effect at least when a touch is occurring. For example, generation module 128 may access stored waveforms or commands to send to actuator 118 and 119. As another example, haptic effect generation module 128 may receive a desired coefficient of friction and utilize signal processing algorithms to generate an appropriate signal to send to actuator(s) 118. Module 128 may receive a desired haptic effect type and select an actuator 119 and command the selected actuator to provide the desired haptic effect.

As a further example, a desired texture may be indicated along with target coordinates for the texture. An appropriate waveform can be sent to a piezoelectric or other actuator to vary the coefficient of friction using high-frequency displacement, with another waveform sent to one or more vibrotactile actuators to generate appropriate displacement of the touch surface (and/or other device components) at a (relatively) lower frequency, or to provide a pop, ping, or other effect when the feature is encountered.

Figure 1B:
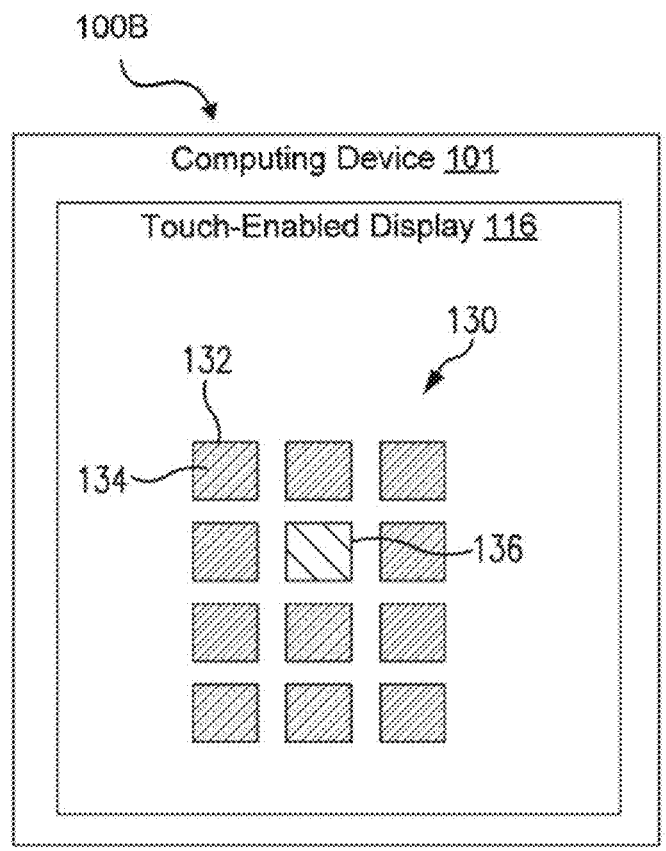
FIGS. 1B and 1C show additional illustrative systems configured to provide composite haptic effects.

A touch surface may or may not overlay (or otherwise correspond to) a display, depending on the particular configuration of a computing system. In FIG. 1B, an external view of a computing system 100B is shown. Computing device 101 includes a touch-enabled display 116 that combines a touch surface and a display of the device. The touch surface may correspond to the display exterior or one or more layers of material above the actual display components.

In this example, a composite haptic effect is selected based on the content of a graphical user interface 130, which in this example shows a 12-*key* keypad such as may be provided by a mobile device. Particularly each key may include a border 132 and interior 134. A composite haptic effect can be selected to generate a variation in friction corresponding to interior 134 and a different haptic output can be used to indicate when a user has reached border 132. In this example, a feature 136 is included in the middle key (corresponding to the "5" key in a standard numeric keypad). For instance, feature 136 may comprise a different texture from a texture of interior 134 or a simulated feature such as a bump or gap serving as a "centering" feature. As a user moves a finger across the keypad, composite effects can be used to denote the border between keys and to indicate when the "5" key is reached by the perception of feature 136.

Figure 1C:
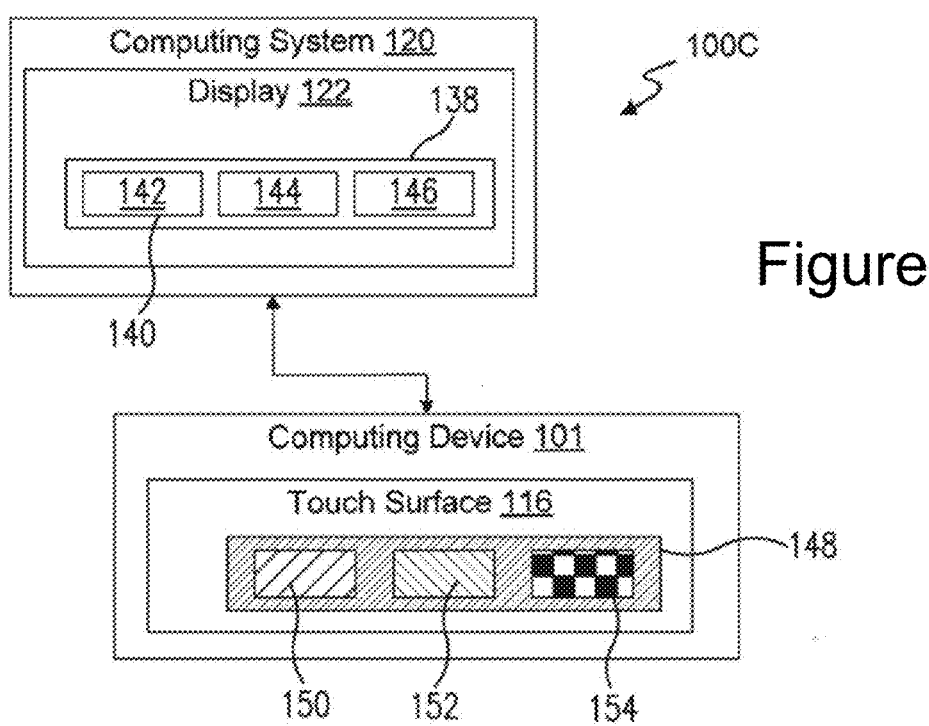

As was noted above, a touch surface need not overlay a display. FIG. 1C illustrates another example of a touch-enabled computing system 100C. In this example, a computing device 101 features a touch surface 116 which is mapped to a graphical user interface provided in a display 122 that is included in computing system 120 interfaced to device 101. For example, computing device 101 may comprise a mouse, trackpad, or other device, while system 120 may comprise a desktop or laptop computer, set-top box (e.g., DVD player, DVR, cable television box), or another computing system. As another example, touch surface 116 and display 122 may be included in the same device, such as a touch-enabled trackpad in a laptop computer featuring display 122.

Whether integrated with a display or otherwise, the depiction of 2-D rectangular touch surfaces in the examples herein is not meant to be limiting. Other embodiments include curved or irregular touch-enabled surfaces that are further configured to provide surface-based haptic effects.

Returning to FIG. 1C, in this example a graphical user interface 138 is shown, comprising a menu bar 140 and buttons 142, 144, and 146. For example, the graphical user interface may comprise an on-screen menu for a home entertainment device, while touch surface 116 is included on a remote control or peripheral. As shown at 148, an area of the touch surface is mapped to menu bar 140. When a user contacts area 148, a composite haptic effect is provided to indicate that the menu bar is selected. For example, the coefficient of friction may differ as between area 148 and areas 150, 152, and 154 (corresponding to buttons 142, 144, and 146, respectively), with vibrotactile or other feedback provided as a user moves through area 148 and crosses into one of areas 150, 152, and 154. As another example, vibrotactile or other haptic output can be used to generate different simulated textures in areas 148, 150, 152, and 154, with the coefficient of friction varied within each area as buttons 142, 144, and/or 146 are actuated.

Figure 2A:
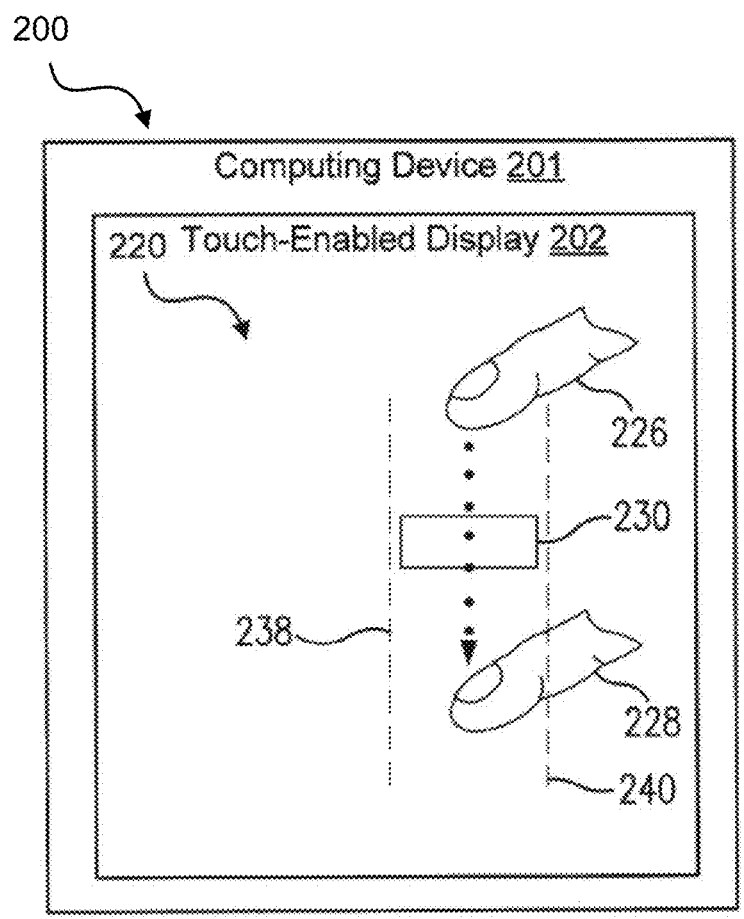
FIG. 2A shows another illustrative system configured to provide composite haptic effects.
Figure 2B:
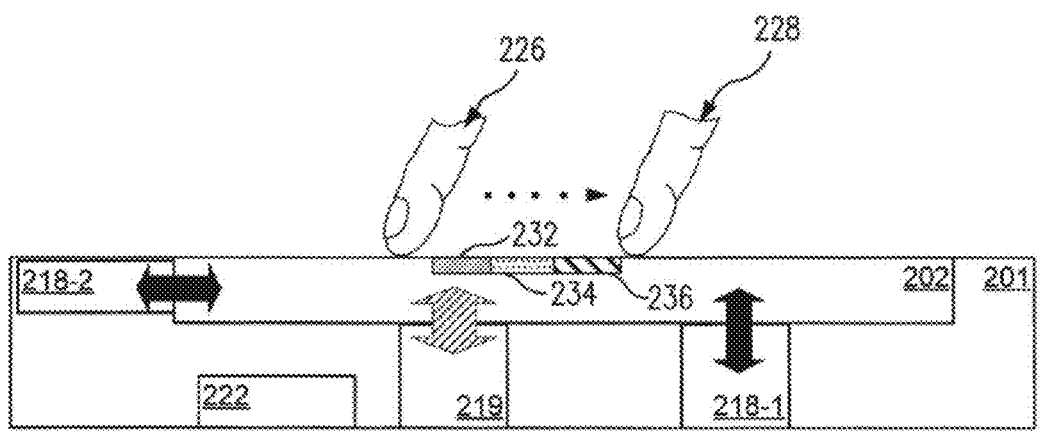
FIG. 2B is a cross-sectional view of the system shown in FIG. 2A.

FIG. 2A shows another computing device 201 featuring a touch-enabled display 202, which again corresponds to a touch surface. FIG. 2B shows a cross-sectional view of device 201. As can be seen in FIG. 2B, in this example two actuators 218-1 and 282-2 are used to vary the coefficient of friction of touch surface 202 while a second actuator 219 provides another haptic output via touch surface 202. For instance, actuator 219 may provide a vibrotactile output such as a pop or ping through touch surface 202 or may raise/lower one or more portions of the touch surface 202. Additionally, FIG. 2B shows another exemplary actuator 222. For example, actuator 222 may be used in addition to or instead of one or more of actuators 218-1, 218-2, or 219. For example, if actuator 219 raises/lowers portions of display 202, actuator 222 may be used to provide a low-frequency vibration output.

Returning to FIG. 2A, an example of providing a composite effect is illustrated at 220. Specifically, a finger 226 contacts the display and moves to the position shown at 228, encountering a simulated feature 230. As can be seen in FIG. 2B, as the finger moves, it initially contacts a first area 232 of the display, then a second area 234, and a third area 236. A composite haptic effect may be used to simulate feature 230. For instance, while the finger encounters area 232 and moves toward area 234, the coefficient of friction of display 202 may be increased by adjusting output of actuators 218-1/218-2. As area 234 is approached and then encountered, actuator 219 may be used to provide a vibrotactile "pop" effect. As the finger moves across area 236, the coefficient of friction of display 202 may be decreased.

A composite haptic effect may comprise a group of effects. For example, lines 238 and 240 indicate a path followed by the finger moving from 226 to 228. In one embodiment, the composite haptic effect includes output generated using actuator 219 and/or 222 if the finger moves outside the path. For example, a variation in friction may be used to simulate feature 230, with a vibration output provided while feature 230 is simulated if the user's finger crosses either of lines 238 and 240.

Figure 3A:
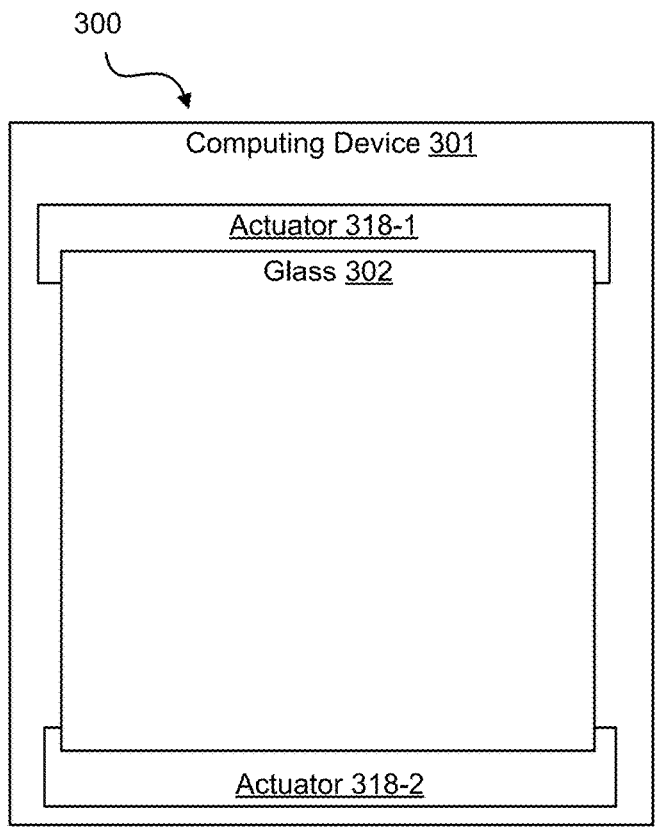
Figure 3B:
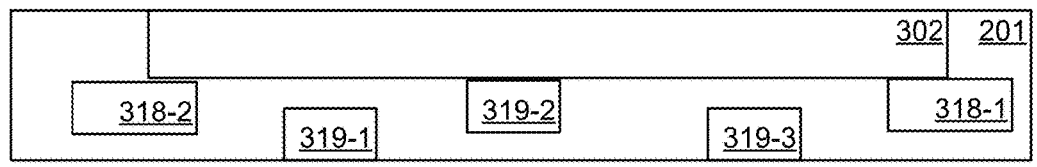
FIG. 3B is a cross sectional view of the system shown in FIG. 3A.

FIGS. 3A-3B depict an illustrative hardware architecture for a device that can provide composite haptic effects. In this example, the touch surface comprises glass panel 302, although another transparent material (or non-transparent) material could be used. For instance, rather than glass, a touchpad (i.e. touch-sensitive device) could be used. A pair of piezoelectric benders 318-1 and 318-2 are bonded to the glass. Use of glass or another transparent material along with free space between the piezoelectric benders can allow for use of a display (not shown) beneath the glass. In some embodiments, the piezoelectric benders can be commanded to reduce the static coefficient of friction of glass 302 by 42%. Some embodiments utilize a bipolar pulse width modulated signal at 24 kHz, with varying amplitude used to vary the coefficient of friction. As an example, voltage can vary between −80 and +80 Volts at a frequency above 20 kHz, with friction variation from 0 to 60% depending on voltage magnitude (or PWM magnitude to produce the voltage magnitude). These example voltage, frequency, and variation ranges are for purposes of example only and are not intended to be limiting.

In the cross-sectional view of FIG. 3B, a plurality of second actuators 319-1, 319-2, and 319-3 are illustrated. For instance, actuator 319-2 may be bonded to panel 302 and can be used to provide low-frequency vibration effects using an eccentric rotating mass (ERM) actuator and/or haptic pops, jolts, and the like via a linear resonant actuator (LRA). Actuators 319-1 and 319-3 may be bonded to the case or housing of device 301 and may comprise the same type of actuator as 319-2 or may be different from actuator 319-2 (and/or one another). For example, in one embodiment, actuator 319-1 comprises an ERM actuator, actuator 319-2 comprises a shape memory alloy used to move panel 302, and actuator 319-3 comprises an LRA actuator. Either or both actuators 319-1 and 319-3 could be bonded to both panel 302 and the housing of device 301.

Illustrative Methods for Determining Haptic Effects to Provide

Figure 4:
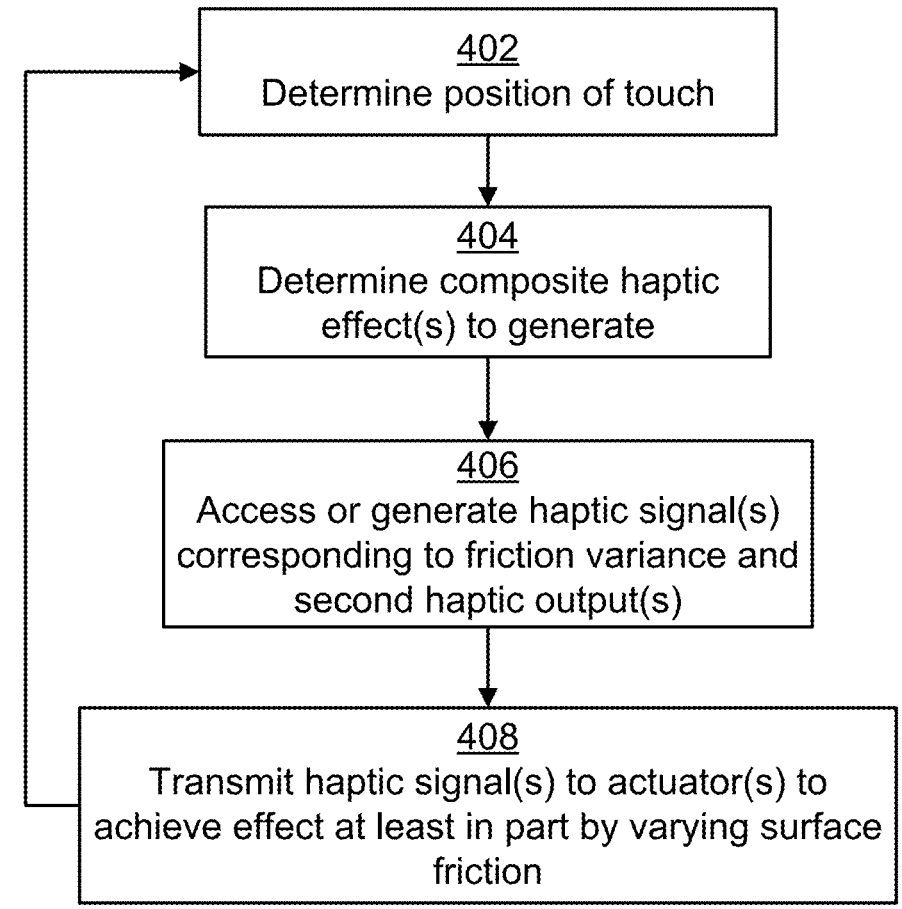
FIG. 4 is a flowchart showing illustrative steps in a method of providing composite haptic effects.

FIG. 4 is a flowchart showing an illustrative method 400 for providing an interface with composite haptic effects including at least one surface-based haptic effects. Block 402 represents determining a position of a touch in a touch area. For example, a processor may utilize one or more sensors embedded in or viewing a touch-enabled display or surface to track a position of a touch on the surface. Based on the current and/or past position of the touch, an interaction with a graphical user interface mapped to the touch area can be determined.

Based on the interaction, one or more composite haptic effects can be selected at block 404, with a composite effect achieved by varying the friction of the touch surface along with providing one or more other haptic outputs.

For example, the touch may occur at a position in the touch surface mapped to a particular texture or feature in a graphical user interface. The composite haptic effect may comprise a simulation of the texture or feature. Additionally or alternatively, the composite haptic effect may comprise an ambient effect (e.g., a texture/feature) and dynamic effect, such as output provided when a feature is initially encountered.

As an example, a gesture can be recognized as a sequence of one or more touches or patterns of touch, such as based on a direction and length of a swipe across the screen, a sequence of discrete touches in a pattern, or another recognizable interaction. If a gesture is recognized, a composite haptic effect associated with the gesture can be selected. For instance, a "Z"-shaped touch trajectory may be recognized as a type of input gesture based on pattern recognition carried out by a processor of the device while the gesture is in progress. One or more composite haptic effects may be associated with the "Z"-gesture in data accessible to the processor indicating an effect to output while the gesture is in progress and/or after the gesture is complete. For example, the data may provide for the surface to take on a texture or a change in friction as the gesture nears completion. Additionally or alternatively, a texture or coefficient of friction of the display may change after the gesture is recognized in order to confirm input of the gesture.

At block 406, one or more haptic signals are accessed and/or generated in order to provide a variation in the coefficient of friction and to generate the second haptic output (or outputs). For example, a processor may access drive signals stored in memory and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

As an example, for a simulated feature such as a gap, obstacle, or texture the current pixel location and/or a projected pixel location for the touch based on a velocity of the touch can be compared to a bitmap specifying composite haptic effects for various pixel positions. Based on the composite haptic effect(s), suitable haptic signals can be accessed/generated to provide the output specified in the bitmap.

As another example, a current or projected location of a touch can be compared to data identifying the location of graphical user interface (GUI) features such as controls, textual content, boundaries, and the like. Then, if a GUI feature is identified at the location, data associating one or more composite haptic effects to the feature can be accessed. For instance, a processor may track the location of a touch and determine the touch is at or approaching a position in the touch area mapped to a particular control (e.g., a button) in the graphical user interface. The processor can then consult a listing of interface elements to determine a composite haptic effect (e.g., a texture, a friction variation) associated with the button and, based on the haptic effect, take further actions to generate the composite haptic effect.

Block 408 represents transmitting the haptic signal or signals to one or more actuators to achieve the composite haptic effect by varying the coefficient of friction and providing one or more other haptic outputs. For instance, if an analog drive signal is to be provided, a processor can utilize an onboard D/A converter to create the signal. If a digital command is provided to the actuator, an appropriate message can be generated by an I/O bus of the processor. The haptic effect may be felt at the point of the touch and/or elsewhere. For example, if a two-finger input gesture is provided, the texture/coefficient of friction at the first finger may be changed in response to recognizing movement of the second finger.

In some embodiments, a baseline haptic signal may be sent to the actuator(s) to generate an ambient haptic effect even in the absence of a selected haptic effect in order to enhance the range of potential effects the device can produce. Thus, transmitting a haptic signal may comprise sending a "stop" command, a "zero" or minimal signal, or another signal to the actuator to reduce intensity as appropriate.

As an example, use of certain actuators, such as piezoelectric actuators, may allow for reduction in the coefficient of friction of a touch surface but not an increase in the coefficient of friction. To provide a range of options, a baseline signal may be provided so that the "ordinary" friction level of the touch surface is below the coefficient of friction the touch surface would have when static. Accordingly, haptic effects may be defined with respect to the baseline, rather than static, value. If maximum friction is desired, a "zero" signal may be sent to the piezoelectric actuator to stop movement of the surface.

Surface-based haptic effects may take any suitable form. For example, some haptic effects may comprise variations in the friction of the touch surface—some portions may be rendered "slicker" or "rougher" than others. As another example, vibrotactile effects may be used, such as vibrations or series of vibrations. Vibrotactile effects and/or variations in friction may be used to simulate the feeling of distinct features, such as boundaries or obstacles. For example, a boundary or edge may be simulated by an increase in friction, with the friction decreasing if the boundary is crossed (in some instances).

Figure 5A:
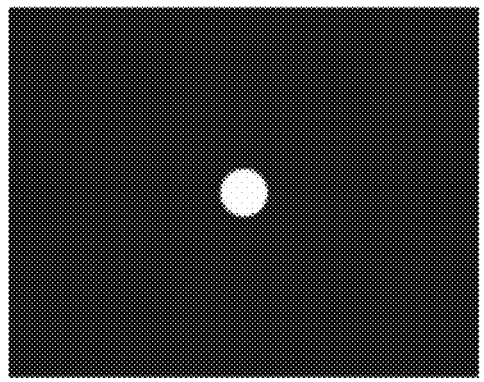
FIGS. 5A-5D show illustrative features that can be simulated using surface-based haptic effects.
Figure 5B:
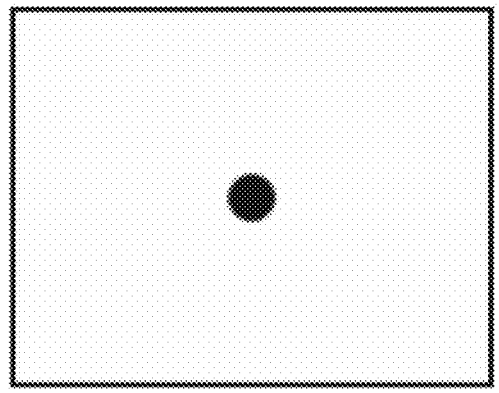

FIGS. 5A-5D each depict an illustrative simulated feature. FIG. 5A shows a simplified example in which the white area represents an area where actuators will be activated, such as by using a non-zero voltage PWM signal. For example, the white area may correspond to a virtual button in the middle of a touch pad, where a user's finger (or another object in contact with a surface) will encounter a lower friction value. FIG. 5B represents an inverses situation—the finger/object may navigate freely in the white area, but may be slowed or stopped at the high friction (black) area. This may, for example, allow a user to more easily locate a button or other location in the touch area.

Figure 5C:
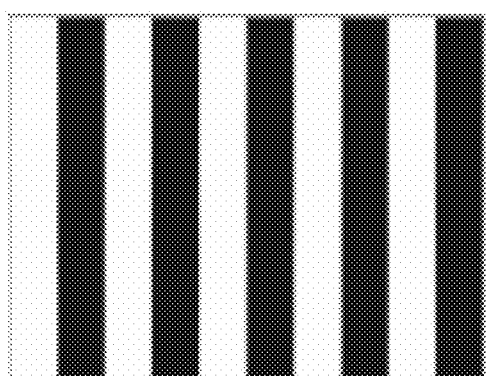

FIG. 5C illustrates a simulated feature comprising a plurality of grooves. As a user's finger or another object moves horizontally across the stripes, the finger/object will encounter increasing and decreasing friction that is perceived as a series of grooves.

As was noted above, a computing system comprising a touch surface configured to provide surface-based haptic effects may determine effects and signals in real time. For example, for any of FIGS. 5A-5D, the system may first determine if the touch position is inside the circle and, if so, provide a suitable output value (FIG. 5A) or cease output (FIG. 5B). Similarly, the system may provide the feature of FIG. 5C by determining if the touch occurs in an area with desired high-friction and, if so, drive the actuator(s).

Figure 5D:
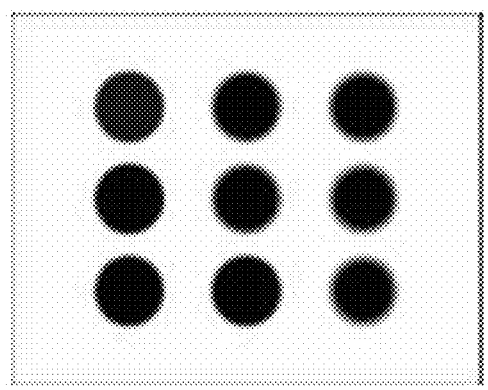

FIG. 5D presents a more complex pattern. For instance, the pattern in FIG. 5D may correspond to desired features associated with an array of keys, such as an array of mobile phone keys, a simulated keyboard, or other controls. Although real time rendering could be used for any of FIGS. 5A-5D, more complex logic may be needed to render each specific circle/button in the pattern. These and even more arbitrary patters may increase the complexity of programming and computation time. Thus, in some embodiments, the surface-based haptic effects can be determined ahead of time and stored in a file. At runtime, the file can be accessed based on a touch position to allow for faster determination and generation of appropriate haptic signals. For FIG. 5D, such a file could include data to drive the actuators to provide a first haptic effect (e.g., high friction) when the touch position is mapped to the circles, and the file could include data to drive the actuators to provide a second effect (e.g., low friction) when the touch position is mapped to a location outside the circles.

The features of FIGS. 5A-5D may be simulated using other types of actuators in addition to or instead of piezoelectric actuators. For example, vibrotactile actuators may be used to provide a vibration, pop, pulse, click, or the like when the circles of FIG. 5A, 5B, or 5D are encountered and/or when the pattern of FIG. 5C is encountered (e.g., a pop or click at each transition from black to white). The haptic effects that can be produced by the actuators can vary depending on the current, voltage, frequency as well as start and stop times. Such haptic effects include, but are not limited to, vibrations, pulses, pops, clicks, damping characteristics, and varying textures. In an embodiment, the multiple actuators are utilized to generate different haptic effects for different applications. For example, the two actuators are configured to provide a vibration or pop upon the user's finger or stylus passing over the boundaries of a graphical object (e.g. keyboard keys), as discussed above.

The features of FIGS. 5A-5D may be simulated using composite haptic effects. For example, a variation of friction may be used along with a click, pop, or other response when an object touching the surface moves from black to white or vice-versa.

Vibrotactile effects and/or variations in friction may additionally or alternatively be used to simulate various textures. Additional detail regarding generation and use of textures can be found in U.S. patent application Ser. Nos. 12/697,010, 12/697,042, and 12/697,037, referenced above and entitled "Systems and Methods for a Texture Engine," "Systems and Methods for Using Multiple Actuators to Realize Textures," and "Systems and Methods for Using Textures in Graphical User Interface Widgets," respectively.

For instance, patterns of differing friction or patterns of vibration may be provided to mimic the feeling of textures such as brick, rocks, sand, grass, fur, various fabric types, water, molasses, and other fluids, leather, wood, ice, lizard skin, metals, and other texture patterns. Other textures not analogous to real-world textures may also be used, such as high-magnitude vibrotactile or other feedback when a "danger" texture is desired.

Generally, a texture can simulate a surface property by providing an output perceived as a spatially varying force. Thus, a texture is contrasted to a vibration output intended to be directly perceived as a time varying force, though of course vibrations can be used in simulating texture.

As an example, a texture may simulate the force felt when a stick or finger is moved over a grating. In one embodiment, the texture force can be characterized by a programmer/developer using parameters that can include a magnitude and a grit. The magnitude specifies the amount of force applied to the object encountering the touch surface (e.g., at each "bump" of the grating). The grit is basically the spacing between forces (e.g., spacing between each of the grating bumps). Alternatively, additional command parameters can be provided to control the position of the "bumps" of the texture force. For example, information can be included to instruct the distance between bumps to vary exponentially over a distance, or vary according to a specified formula. Additionally, a given texture may be defined as a plurality of superimposed grits and magnitudes.

Figure 6A:
FIGS. 6A-6H show illustrative features, specifically textures, that can be simulated using surface-based haptic effects.

FIG. 6A is an illustration of one of the textures that a texture engine may generate according to one embodiment of the present invention. The embodiment shown in FIG. 6A comprises brick. The texture of brick is characterized by having a rough irregular texture from bricks, punctuated with the feel of gritty valleys from the mortar. A system for a texture engine may generate the rough irregular texture of brick by driving an actuator, such as a LRA, LPA, or FPA, with a random signal with medium to high maximum variance while the user's finger is moving. In some embodiments, this variance may be adjusted for different roughness. In some embodiments, the transition from brick to mortar may be rendered by a high duration pop created by an ERM. Additionally, the coefficient of friction may be varied between the brick and mortar portions. If the mortar is thick enough, a fine texture may be rendered by driving an actuator with a lower magnitude signal with a higher variance than that used to drive the actuator outputting the texture of the brick.

Figure 6B:

FIG. 6B is an illustration of one of the textures that a texture engine may generate according to one embodiment of the present invention. The embodiment shown in FIG. 6B comprises rocks. The texture of rocks is characterized by smooth surfaces punctuated with transitions as the user moves from rock to rock. In order to output the texture of a rock, an actuator, such as an FPA and/or piezoelectric actuator can be used to create patches of low friction. Individual rocks may be rendered by a non-visual edge map of the displayed image, and outputting a high magnitude haptic signal to an actuator, such as an LRA, LPA or ERM, when the touch-sensitive interface detects the user's movement. For example, a high-magnitude output can be provided whenever the touch-sensitive interface detects that the user's finger is transitioning from one rock to another. The coefficient of friction may be varied as between rocks, as well.

Figure 6C:
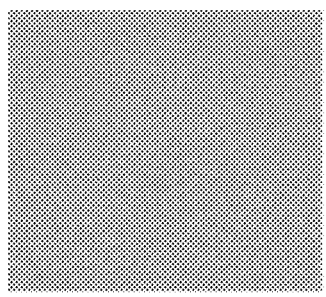

FIG. 6C is an illustration of one of the textures that a texture engine may generate according to one embodiment of the present invention. The embodiment shown in FIG. 6C comprises sand or sandpaper. Sand is characterized by a rough, gritty feel as well as the sensation a pile of sand particles building up in front of the user's finger. In order to output the rough gritty texture, of sand, an actuator, such as an LRA, LPA or FPA is driven with a random signal with high maximum variance while the user's finger is moving. In some embodiments, the processor may adjust the variance of the signal to create different degrees of roughness. To create the feeling of sand piling up, an actuator such as an FPA may be used. In such an embodiment, when user moves their finger across the touch screen, the processor will drive the actuator with a signal that starts with a low intensity and builds as the user moves their finger in one direction. A piezoelectric or other actuator can be used to increase the coefficient of friction to simulate sand build-up as well.

In another embodiment, the texture shown in FIG. 6C may comprise sandpaper. Sandpaper is characterized by having a rough, gritty feel. To create the rough, gritty feel the processor drives an actuator, such as an LRA, LPA or FPA with a random signal with high maximum variance. In some embodiments, this signal is output only while the user's finger is moving across the surface the touch sensitive interface. In some embodiments, the processor may adjust the variance of the signal to change the level of roughness. Additionally, the roughness may be generated or emphasized through abrupt changes in the coefficient of friction.

Figure 6D:

FIG. 6D is an illustration of one of the textures that a texture engine may generate according to one embodiment of the present invention. In the embodiment shown in FIG. 6D, the texture comprises the texture of grass. Grass is characterized by a periodic light sensation that almost tickles the user's finger. In order to create the sensation of grass, the processor may drive an actuator, such as an FPA or piezoelectric actuator, with a signal configured to create patches of low friction overlaid with patches of grass. In some embodiments, the processor may render individual grass blades by having a non-visual edge map of the displayed image and outputting a low magnitude signal to an actuator such as an LPA or ERM when the user interface detects movement between the simulated blades.

Figure 6E:

FIG. 6E is an illustration of one of the textures that a texture engine may generate according to one embodiment of the present invention. In the embodiment shown in FIG. 6E, the texture comprises the texture of fabric. Fabric is characterized by a light smooth sensation. In order to create the sensation of the texture of fabric, the processor may drive an actuator such as an LPA or an LRA with low magnitude high frequency signals as the user's finger moves across the surface of the touch-sensitive interface. The "grain" of the fabric may be simulated by varying friction levels of the display to provide lower friction when moving along the grain.

Figure 6F:

FIG. 6F is an illustration of one of the textures that a texture engine may generate according to one embodiment of the present invention. In the embodiment shown in FIG. 6F, the texture comprises the texture of water or molasses. Water is characterized by having almost no sensation. However, water that is disturbed may splash around and hit against the user's finger. To emulate the texture of water, the processor may drive an actuator such as an FPA to reduce the friction on the surface of the touch-sensitive interface. To emulate the water sloshing, the processor may output the haptic signal only when the user is touching the screen. To emulate the texture of a more viscous fluid, such as molasses, or oil, the processor may drive the actuator with a signal configured to increase the friction on the user's finger as it moves across the surface of the touch-sensitive interface.

Figure 6G:
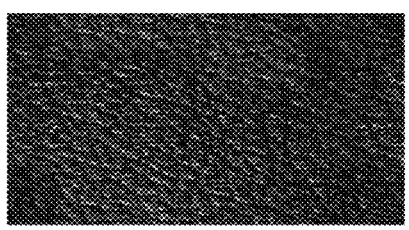

FIG. 6G is an illustration of one of the textures that a texture engine may generate according to one embodiment of the present invention. In the embodiment shown in FIG. 6G, the texture comprises the texture of leather. Leather is characterized by an overall smooth feeling that comprises the bumps and valleys of the surface of the leather. In order to create the sensations of the texture of leather, the processor may drive an actuator, such as an FPA or piezoelectric actuator, with a signal configured to output a haptic effect that reduces friction as the user's finger moves across the surface of the touch-sensitive interface. The processor can output the cracks and bumps by driving the actuator with a very short low magnitude haptic signal at times when the touch-sensitive interface detects that the user's finger is moving.

Figure 6H:
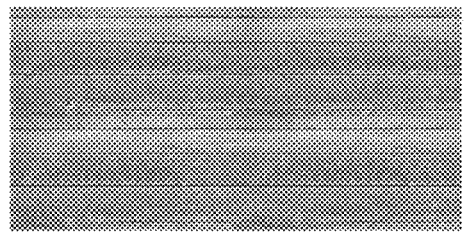

FIG. 6H is an illustration of one of the textures that a texture engine may generate according to one embodiment of the present invention. In the embodiment shown in FIG. 6E, the texture comprises the texture of wood. Wood may be characterized by an irregular bumpy texture punctuated by a sharp transition as the user moves from board to board. In order to create the irregular bumpy texture, the processor may drive an actuator such as an LRA, LPA, or FPA with a non-visual edge map of the displayed image and drive the actuator with a very short low magnitude signal at various times when the user's finger is moving. To output the transition from plank to plank, the processor may output a haptic signal configured to cause the actuator to generate a high magnitude, short duration, pop. The friction of the touch surface can be varied when moving between planks, but can be maintained (or only slightly varied) when moving along the grain of the wood.

In other embodiments, haptic effects associated with different textures may be output. For example, in one embodiment, the processor may transmit a haptic signal configured to cause the actuator to output a haptic effect configured to cause the user to feel a texture associated with the texture of ice. Ice is characterized by low friction, in some embodiments, ice has a completely smooth texture, in other embodiments, ice comprises a fine low magnitude gritty texture. In order to create the texture of ice, the processor may determine a haptic signal configured to cause the actuator to reduce the friction as much as possible while the user moves their finger across the surface of the touch-sensitive interface. In another embodiment, the processor may drive an actuator such as an LPA or LRA, with a haptic signal configured to output low magnitude effects while the user moves their finger. These low magnitude effects may be associated with imperfections or grit on the surface of the ice.

In another embodiment, the processor may drive the actuator with a signal configured to cause the actuator to output a haptic effect approximating the texture of lizard skin. Lizard skin is characterized by an overall smooth sensation punctuated by transitions from bump to bump on the skin. In order to implement a haptic effect comprising the texture of lizard skin, the processor may drive an actuator with a haptic signal configured to cause the actuator to create patches of low friction on the touch-sensitive interface. The processor may render cracks on the surface of the skin by outputting high magnitude haptic signals periodically when the touch-sensitive interface detects that the user's finger is moving across its surface. These high magnitude signals may approximate the cracks in the surface of the skin.

In yet another embodiment, the processor may drive the actuator with a signal configured to cause the actuator to output a haptic effect approximating the texture of fur. Fur is characterized by a periodic light sensation that is very soft to the touch. In order to implement a haptic effect comprising the texture of fur, the processor may drive the actuator with a haptic signal configured to cause the actuator to output a haptic effect configured to reduce the friction the user feels on the surface of the touch-sensitive interface. The processor may further render individual hairs outputting a low magnitude pulsing haptic signals as the touch-sensitive interface detects the user's movement.

In yet another embodiment, the processor may drive the actuator with a signal configured to cause the actuator to output a haptic effect approximating the texture of metal. Metal is characterized by a smooth low friction surface that, in some embodiments, includes light grit. In order to implement a haptic effect comprising the texture of metal, the processor may drive the actuator with a signal configured to lower the friction the user feels on the surface of the touch-sensitive interface. In some embodiments, the processor may render individual bumps by outputting brief high magnitude haptic signals when the touch-sensitive interface detects that the user is moving over its surface. These brief high magnitude signals may approximate grit on the surface of the metal.

In yet another embodiment, the processor may drive the actuator with a signal configured to cause the actuator to output a haptic effect approximating another sensation, for example, heat. In such an embodiment, the processor may output a haptic signal configured to cause the actuator to output a high frequency jolting effect when the user touches elements of the display that are associated with heat.

Figure 7:
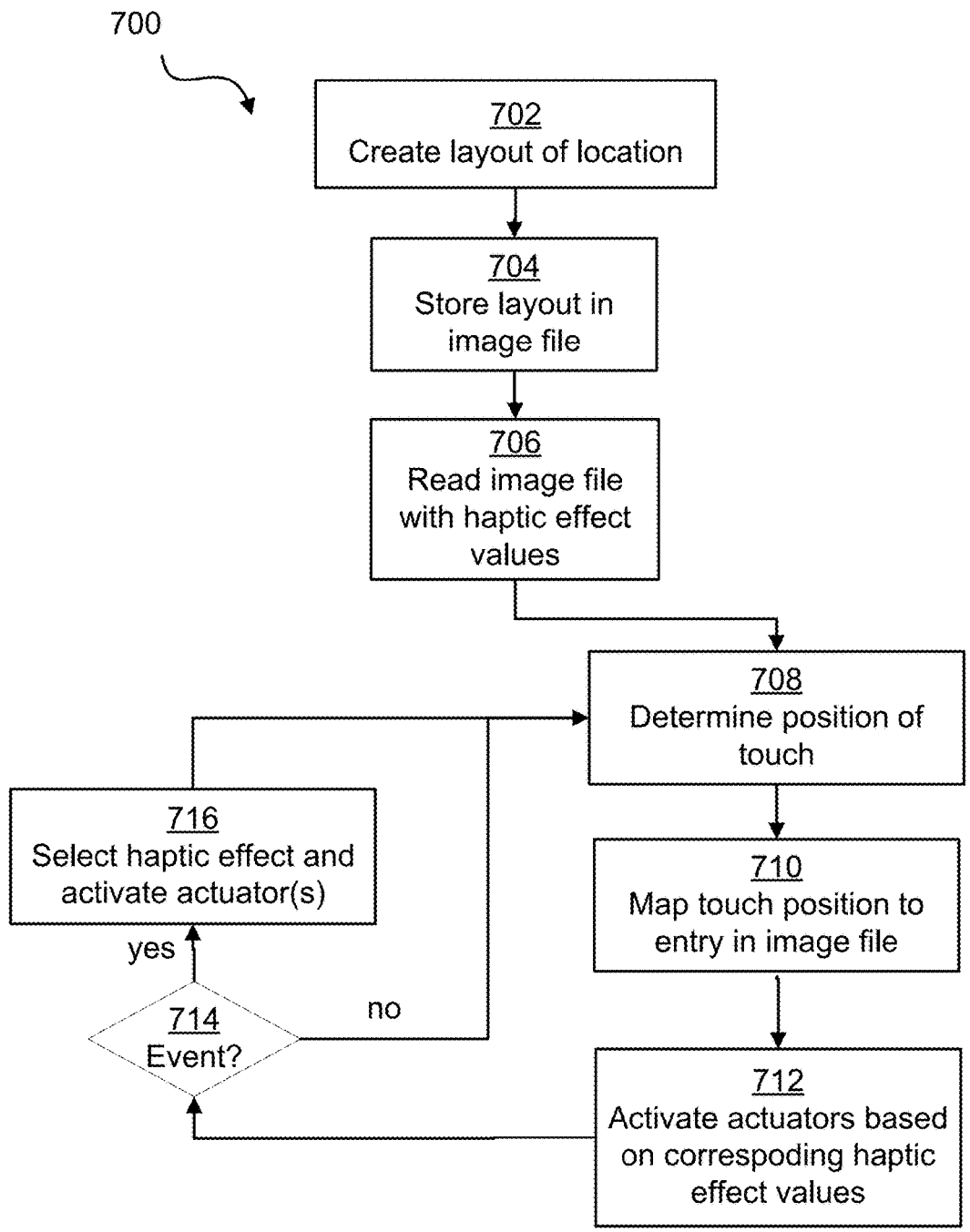
FIG. 7 is a flowchart showing illustrative steps in another method of providing composite haptic effects.
Figure 8:
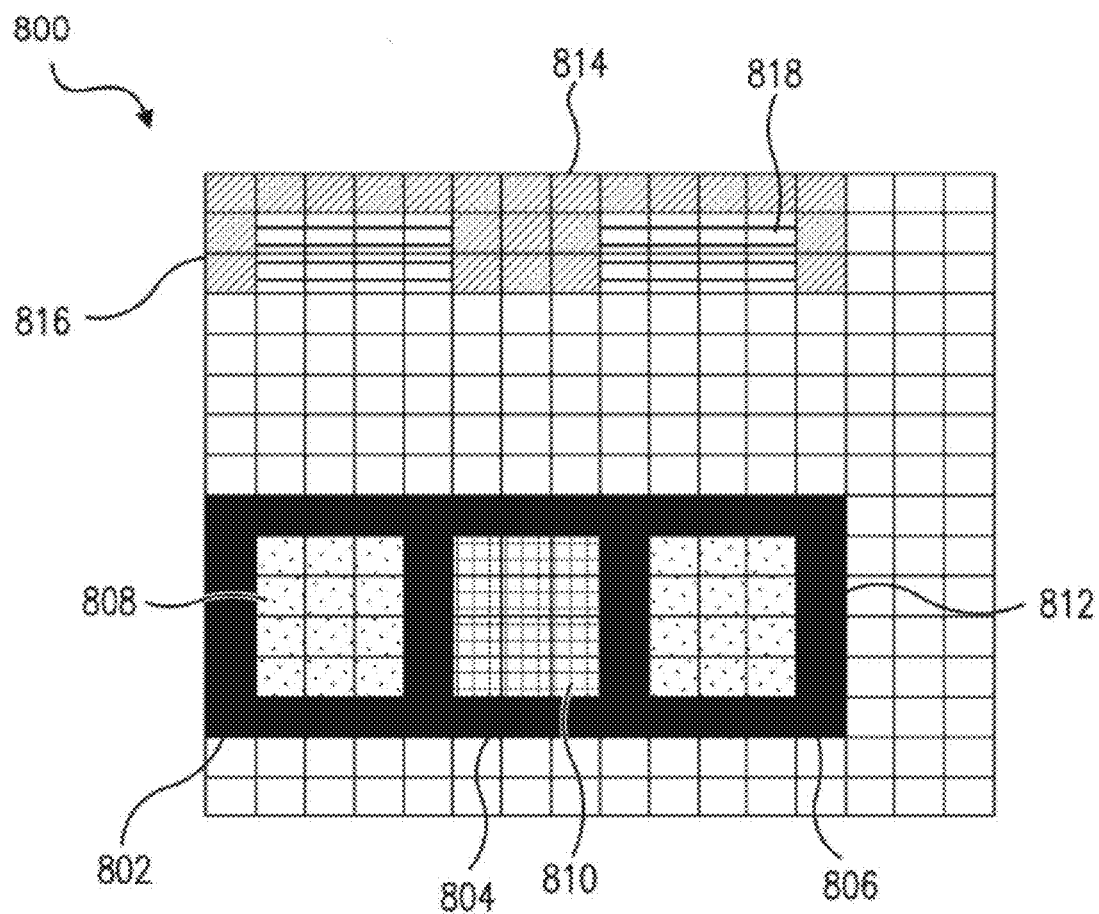
FIG. 8 a diagram illustrating an example of a reference file for use in generating composite haptic effects.

FIG. 7 is a flowchart showing illustrative steps in another method 700 of providing composite haptic effects. FIG. 7 is a flowchart showing an exemplary method 700 for providing a simulated feature by creating and using a reference file. FIG. 8 shows an example of a reference file comprising an array of pixels. Blocks 702 and 704 represent preprocessing-activities that occur prior to use of a reference file to determine a composite haptic effect. In this example, a single reference file is used to determine friction values and at least one other haptic output used in providing a composite haptic effect. Additionally, a "reference file" may comprise multiple files used together.

Block 702 represents creating a layout of a location and block 704 represents storing the layout in an image file, such as an array of pixels in a bitmap or other image file. For example, arbitrary shapes may be "drawn" in order to specify desired friction values. In FIG. 8, white pixels are shown to indicate where no friction adjustment or other output is intended, while shaded pixels indicate a value of a desired coefficient of friction or even a value usable to drive an actuator (e.g., a desired PWM voltage level, frequency, etc.). Alternatively, white pixels may indicate maximum drive, while various degrees of shading indicate lower drive values, with black representing zero drive. In an embodiment, white pixels and black pixels only are used, with the colors corresponding to on/off states of the actuators of a device.

In this example, different degrees of shading are represented by cross-hatching. In practice, each pixel may comprise multiple values (e.g., each pixel may have an RGB value), with the multiple values providing different data, such as drive levels for different actuators and the like. Additionally, a reference file may include multiple layers for specifying various parameters for each pixel position. For example, one layer may be used to define variations in the coefficient of friction, with one or more other layers used to define drive values or other information for use in outputting a vibrotactile or other haptic output. This example shows a relatively small number of pixels; in practice, the array may comprise thousands or millions of pixels.

In this example, three buttons 802, 804, and 806 are shown, with button borders indicated by solid shading. Respective interiors 808, 810, and 812 have different shading and are intended to represent different textures, friction values, or other effects corresponding to the button interiors. A menu bar is shown with different shading at 814, along with two menu commands 816 and 818 with the same shading as one another, corresponding to different haptic effects that can be used to indicate when the menu bar is encountered and then when menu items are encountered. Although not shown here, transition areas between low and high (or high and low) friction or other effects could be included.

Returning to FIG. 7 and method 700, once a reference file is created, it can be loaded into memory and read as shown at block 706 to determine composite haptic effects for output. For example, some or all of the pixel array may be maintained in working memory of a processor carrying out a position detection and feature simulation routine. In an embodiment, the pixel array is distributed alongside a corresponding image of a graphical user interface. In additional embodiments, the pixel array is a layer or component of the graphical user interface image, and in further embodiments the array is a separate file not associated with a graphical user interface.

Block 708 represents determining a position of a touch. For example, a sensor may provide data used to determine a pixel position of a touch in an array of pixels mapped to a touch area. Non-pixel coordinates may be used in identifying the location of a touch, with appropriate transforms used during the mapping step below.

Block 710 represents mapping the touch position to an entry (or entries) in the image file. For instance, the touch area may be mapped directly so that a touch at pixel (x,y)=(10, 12) results in accessing one or more pixel values in the image at image (x,y)=(10,12). However, more complex mappings may be used. For example, a touch position and velocity may be used to map a pixel value in the touch area to a different pixel value in the image file. For instance, the size of the touch area and the size of the pixel array may differ, with a scaling factor used to map touch locations to pixel values.

Block 712 represents activating one or more actuators to provide a surface-based haptic effect based at least in part on data from the image file. For instance, the pixel value in the image file may be mapped to a desired coefficient of friction. A device carrying out method 700 may determine, based on the pixel position and the desired coefficient of friction, a suitable signal or signals to send to one or more actuators to generate the desired coefficient of friction. As another example, the pixel value may indicate a drive signal more directly, such as a voltage/amplitude/frequency value or offset for a PWM signal to be sent to a piezoelectric actuator. Data of the array may also be configured for use in generating a drive signal for another type of actuator.

As a more complex example, each pixel address may be associated with three intensity values (i.e., RGB). Each of the three intensity values can be associated with a signal intensity/frequency for a corresponding actuator in some embodiments. As another example, some values may specify intensity and others specify duration of operation for the same actuator. As a further example, different pixel intensity values may be correlated to different desired textures or components used to drive actuators to simulate a single texture. For example, textures 808, 810, and 812 may be achieved using a combination of friction variations and vibrations. When a touch occurs at a location mapped to the areas, the appropriate actuator(s) can be used to generate the textures.

Method 700 may determine touch locations mapped to multiple pixels in the image file. For example, a large touch may correspond to a range of pixel addresses in the image file. Values from the range of pixel addresses may be considered together, or analysis may be made to "pinpoint" the touch location and use values from a corresponding single pixel address.

In this example, method 700 checks at 714 for one or more events tied to a haptic effect. As was noted above, a composite haptic effect may utilize one or more actuators that provide a haptic output to confirm a selection, indicate a change in status, or otherwise provide feedback to a user. Block 716 represents using one or more actuators to provide haptic output corresponding to the event, and then continuing back to 708 to determine the touch position.

For example, a user may move a finger or other object across a region of a touch surface that is mapped to button 802 and on to a region mapped to button 804. Texture 808 may be generated and then, as the finger/object moves to button 804, a click, pop, or other effect may be output to indicate the button borders. A click or button-press event may be registered if the user lingers over a button for a predetermined time and/or if the touch-enabled system registers a touch or increase in pressure. In response to the click event, a click, pop, or other effect can be output to simulate the response of a physical button (or another response).

In some embodiments, a computing device featuring a touch surface with surface-based haptic effects can output different surface-based haptic effects based on sequences of inputs. Thus, the simulated features of the touch surface can vary based on a state of a device associated with the surface. In some embodiments, this can be implemented using a reference file with multiple layers; each layer can correspond to a particular state. The states can be changed based on various input conditions, for instance.

For example, a touch surface may be configured to act as a keypad, such as on a mobile device. The keypad may feature three rows of keys corresponding to numbers 1-9 and a fourth row with "0," "*", and "#" keys. For an initial state, the touch surface may be configured to provide a centering feature, such as a higher friction level at the "5" key than in the remainder of the layout.

The computing device can be configured to change the state of the touch surface in response to user input based on tracking the input relative to the touch-sensitive area. For example, once the system determines that the user has found the "5" key, e.g. by detecting touching, hovering, or other activity indicating that the key has been located (but not necessarily selected), the surface-based effects can be provided based on a different state. If a multi-layer reference file is used, for example, a different layer can be loaded into memory. In the second state, for instance, boundaries between keys can be provided so that a user can proceed from the center to a desired key without the need for visual feedback (although, of course, visual, auditory, or other feedback can be provided alongside any embodiments of the present subject matter).

The informational content or meaning of surface-based haptic effects can vary in various embodiments. For example, effects may be used to identify particular portions of a touch surface mapped to areas in a graphical user interface, simulated keys or other controls, or may be provided for aesthetic or entertainment purposes (e.g., as part of a design and/or in a game). Effects may be provided for communication purposes as well. For example, Braille or other tactile-based communications methods can be facilitated.

GENERAL CONSIDERATIONS

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a sensor configured to detect a touch in a touch area when an object contacts a touch surface;
   a processor in communication with the sensor and configured to:
   determine a first haptic effect based in part on data received from the sensor by mapping a location of the touch to a mapping file comprising haptic data associated with multiple layers of a user interface, each layer associated with a state of the user interface; and
   transmit a first haptic signal associated with the first haptic effect; and
   a first haptic output device in communication with the processor and configured to receive the first haptic signal and output the first haptic effect.

2. The system of claim 1, further comprising a second haptic output device, and wherein the processor is further configured to determine a second haptic effect and transmit a second haptic signal associated with the second haptic effect to the second haptic output device.

3. The system of claim 2, wherein the first haptic output device comprises a piezoelectric actuator, and wherein the second haptic output device comprises one or more of: a second piezoelectric actuator, a shape memory alloy, an electroactive polymer, a composite piezoelectric actuator, an electromagnetic actuator, an eccentric rotational mass actuator, a linear resonant actuator, or a voice coil actuator.

4. The system of claim 3, wherein the first haptic effect is configured to vary a coefficient of friction on the touch surface to simulate a background texture, and the second haptic effect is configured to simulate a feature overlaying the background texture.

5. The system of claim 3, wherein the mapping file comprises a plurality of values, including a first value used to generate the first haptic signal and a second value used to generate the second haptic signal.

6. The system of claim 1, wherein the processor is further configured to determine a pressure of the touch based on data from the sensor, and wherein the first haptic effect is determined based at least in part on the pressure of the touch.

7. The system of claim 1, further comprising a display, the display comprising a plurality of pixels and defining a display area, the display configured to output an image based at least in part on a display signal, and wherein the touch surface corresponds to the display or a material above the display.

8. The system of claim 7, wherein the mapping file further comprises data associated with the plurality of pixels.

9. The system of claim 1, wherein the first haptic effect is configured to increase a coefficient of friction of the touch surface.

10. A method comprising:
  receiving a sensor signal from a sensor configured to detect a touch in a touch area when an object contacts a touch surface;
  determining a first haptic effect based in part on data received from the sensor by mapping a location of the touch to a mapping file comprising haptic data associated with multiple layers of a user interface, each layer associated with a state of the user interface; and
  transmitting a first haptic signal associated with the first haptic effect to a first haptic output device.

11. The method of claim 10, further comprising determining a second haptic effect and transmitting a second haptic signal associated with the second haptic effect to a second haptic output device.

12. The method of claim 11, wherein the first haptic output device comprises a piezoelectric actuator, and wherein the second haptic output device comprises one or more of: a second piezoelectric actuator, a shape memory alloy, an electroactive polymer, a composite piezoelectric actuator, an electromagnetic actuator, an eccentric rotational mass actuator, a linear resonant actuator, or a voice coil actuator.

13. The method of claim 12, wherein the first haptic effect is configured to vary a coefficient of friction on the touch surface to simulate a background texture, and the second haptic effect is configured to simulate a feature overlaying the background texture.

14. The method of claim 12, wherein the mapping file comprises a plurality of values, including a first value used to generate the first haptic signal and a second value used to generate the second haptic signal.

15. The method of claim 10, further comprising determining a pressure of the touch based on data from the sensor, and wherein the first haptic effect is determined based at least in part on the pressure of the touch.

16. The method of claim 10, wherein the first haptic effect is configured to increase a coefficient of friction of the touch surface.

17. A non-transitory computer readable medium embodying program code executable by a processor, the program code, when executed, configured to cause the processor to:
  receive a sensor signal from a sensor configured to detect a touch in a touch area when an object contacts a touch surface;
  determine a first haptic effect based in part on data received from the sensor by mapping a location of the touch to a mapping file comprising haptic data associated with multiple layers of a user interface, each layer associated with a state of the user interface; and
  transmit a first haptic signal associated with the first haptic effect to a first haptic output device.

18. The non-transitory computer readable medium of claim 17, further comprising program code, which when executed by processor is configured to cause the processor to: determine a second haptic effect and transmitting a second haptic signal associated with the second haptic effect to a second haptic output device.

19. The non-transitory computer readable medium of claim 18, wherein the first haptic output device comprises a piezoelectric actuator, and wherein the second haptic output device comprises one or more of: a second piezoelectric actuator, a shape memory alloy, an electroactive polymer, a composite piezoelectric actuator, an electromagnetic actuator, an eccentric rotational mass actuator, a linear resonant actuator, or a voice coil actuator.

20. The non-transitory computer readable medium of claim 17, wherein the first haptic effect is configured to increase a coefficient of friction of the touch surface.

* * * * *